(12) United States Patent
Wu et al.

(10) Patent No.: US 11,516,843 B2
(45) Date of Patent: Nov. 29, 2022

(54) COMMUNICATIONS METHOD, APPARATUS, AND DEVICE, AND STORAGE MEDIUM

(71) Applicant: Huawei Technologies Co., Ltd., Shenzhen (CN)

(72) Inventors: Ji Wu, Shanghai (CN); Jun Zhu, Shenzhen (CN); Qiong Jia, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 167 days.

(21) Appl. No.: 17/031,604

(22) Filed: Sep. 24, 2020

(65) Prior Publication Data

US 2021/0014895 A1 Jan. 14, 2021

Related U.S. Application Data

(63) Continuation of application No. PCT/CN2019/079565, filed on Mar. 25, 2019.

(30) Foreign Application Priority Data

Mar. 26, 2018 (CN) .......................... 201810254840.9

(51) Int. Cl.
H04W 74/08 (2009.01)
H04W 56/00 (2009.01)

(52) U.S. Cl.
CPC ..... *H04W 74/0808* (2013.01); *H04W 56/001* (2013.01); *H04W 74/0891* (2013.01)

(58) Field of Classification Search
CPC .......... H04W 74/0808; H04W 56/001; H04W 74/0891; H04W 74/006; H04L 1/0067;
(Continued)

(56) References Cited

U.S. PATENT DOCUMENTS

2017/0310434 A1 10/2017 Harada et al.
2017/0373914 A1 12/2017 Harada et al.
(Continued)

FOREIGN PATENT DOCUMENTS

| CN | 107211281 A | 9/2017 |
|---|---|---|
| WO | 2017144300 A1 | 8/2017 |
| WO | 2019023241 A1 | 1/2019 |

OTHER PUBLICATIONS

Fujitsu, "Discussion on remaining details on SS block and SS burst set design," 3GPP TSG RAN WG1 Meeting #90, Prague, Czech Republic, Aug. 21-25, 2017, R1-1712733, 6 pages.
(Continued)

*Primary Examiner* — Eric Myers
(74) *Attorney, Agent, or Firm* — Slater Matsil, LLP

(57) ABSTRACT

This application provides a communications method, which includes: performing, by a network device, LBT on a first carrier, and determining a time offset when the LBT is completed, where the first carrier is used to send a first SS Burst Set, and the time offset is a time offset of an actual transmission time of the first SS Burst Set on the first carrier relative to a configured transmission time of the first SS Burst Set; sending, by the network device, the time offset to a terminal; and receiving, by the terminal, the time offset, and performing rate matching on the first carrier based on the time offset. Thus, the terminal may determine the actual transmission time of the first SS Burst Set based on the time offset, to perform the rate matching and accurately parse downlink data, thereby improving reliability of a communications system.

19 Claims, 21 Drawing Sheets

(58) Field of Classification Search
CPC . H04L 27/2656; H04L 27/2675; H04L 5/001; H04L 5/0048; H04L 27/0006
See application file for complete search history.

(56) References Cited

U.S. PATENT DOCUMENTS

2018/0020479 A1    1/2018  Harada et al.
2019/0037481 A1*   1/2019  Zhang ................... H04L 5/0032

OTHER PUBLICATIONS

Samsung, "Remaining details on SS block and SS burst set design," 3GPP TSG RAN WG1 #90, Prague, P.R. Czechia, Aug. 21-25, 2017, R1-1713552, 4 pages.
Interdigital Inc., "Considerations on Synchronization Signal for NR Unlicensed Spectrum," 3GPP TSG RAN WG1 Meeting 92, Athens, Greece, Feb. 26-Mar. 2, 2018, R1-1802647, 4 pages.
Vivo, "Design considerations for standalone operation in NR unlicensed spectrum", 3GPP TSG RAN WG1 Meeting #92, R1-1801558, Feb. 26-Mar. 2, 2018, 4 pages, Athens, Greece.

* cited by examiner

COMMUNICATIONS METHOD, APPARATUS, AND DEVICE, AND STORAGE MEDIUM

CROSS-REFERENCE TO RELATED APPLICATIONS

This application is a continuation of International Application No. PCT/CN2019/079565, filed on Mar. 25, 2019, which claims priority to Chinese Patent Application No. 201810254840.9, filed on Mar. 26, 2018. The disclosures of the aforementioned applications are hereby incorporated by reference in their entireties.

TECHNICAL FIELD

This application relates to the field of communications technologies, and in particular, to a communications method, apparatus, and device, and a storage medium.

BACKGROUND

A synchronization signal burst set (SS Burst Set) is defined in the new radio (NR) standard, and is mainly used by a terminal to perform initial access, system message update, beam management, and the like. Usually, duration of each SS Burst Set is 5 milliseconds (ms), and a periodicity may be 5, 10, 20, 40, 80, or 100 ms. FIG. 1 shows a possible structure of the SS Burst Set. The SS Burst Set includes several synchronization signal blocks (SSB). An SSB is a signal structure, and is applicable to a 5G communications system and a future communications system. The synchronization signal block may also be referred to as a synchronization signal/physical broadcast channel block (SS/PBCH block), or may also have another name. This is not limited in this application. The synchronization signal block may usually include a primary synchronization signal (PSS), a secondary synchronization signal (SSS), and a physical broadcast channel (PBCH). In an example shown in FIG. 1, each SSB lasts for four orthogonal frequency division multiplexing (OFDM) symbols. The PSS and the SSS are mainly used to help the terminal identify a cell and synchronize with the cell, and the PBCH includes most basic system information, for example, a system frame number or intra-frame timing information. The terminal cannot access the cell unless the terminal successfully receives the synchronization signal block. When a carrier frequency is less than 6 GHz, each SS Burst Set includes a maximum of eight SSBs. When the carrier frequency is greater than 6 GHz, each SS Burst Set includes a maximum of 64 SSBs. The SSBs may correspond to different beam directions.

For a licensed band, a network device configures a time-frequency resource for the SS Burst Set, in other words, a configured transmission time of the SS Burst Set is fixed. However, on an unlicensed band, a listen before talk (LBT) channel contention access mechanism is usually used. Due to impact of LBT, the network device may not be capable of sending the SS Burst Set at the configured transmission time of the SS Burst Set, and when the terminal still performs rate matching based on the configured transmission time, the terminal may not accurately obtain a time-frequency resource of downlink data, and cannot accurately parse the downlink data. Consequently, reliability of the communications system is reduced.

SUMMARY

This application provides a communications method, apparatus, and device, and a storage medium, so that downlink data may be accurately parsed, thereby improving reliability of a communications system.

According to a first aspect, this application provides a communication method, including: performing, by a network device, listen before talk LBT on a first carrier, and determining a first time offset when the LBT is completed, where the first carrier is used to send a first synchronization signal burst set SS Burst Set, and the first time offset is a time offset of an actual transmission time of the first SS Burst Set on the first carrier relative to a configured transmission time of the first SS Burst Set; and sending, by the network device, the first time offset to a terminal.

Beneficial effects of this application include: According to the method, the terminal may determine the actual transmission time of the first SS Burst Set based on the first time offset, to perform rate matching and accurately parse downlink data, thereby improving the reliability of the communications system.

Optionally, the method further includes: performing, by the network device, the LBT on a second carrier, and determining a second time offset when the LBT is completed, where the second carrier is used to send a second SS Burst Set, and the second time offset is a time offset of an actual transmission time of the second SS Burst Set on the second carrier relative to a configured transmission time of the second SS Burst Set; and if there is a first preset relationship between the second time offset and the first time offset, skipping sending, by the network device, the second time offset; or if there is no first preset relationship between the second time offset and the first time offset, sending, by the network device, the second time offset.

Beneficial effects of this application include: If there is a first preset relationship between the second time offset and the first time offset, the network device skips sending the second time offset to the terminal, so that the terminal implements the rate matching, thereby reducing system signaling overheads.

Optionally, the first preset relationship is that the second time offset is the same as the first time offset, or there is a fixed time interval between the first time offset and the second time offset.

The following describes a communication method on a terminal side. Effects of the communication method are the same as technical effects of the first aspect and optional manners of the first aspect. Details about the technical effects are not described below again.

According to a second aspect, this application provides a communication method, including: receiving, by a terminal, a first time offset sent by a network device, where the first time offset is a time offset of an actual transmission time of a first synchronization signal burst set SS Burst Set on a first carrier relative to a configured transmission time of the first SS Burst Set; and performing, by the terminal, rate matching on the first carrier based on the first time offset.

Optionally, the method further includes: when the terminal does not receive a second time offset, performing, by the terminal, the rate matching on a second carrier based on the first time offset, where the second time offset is a time offset of an actual transmission time of a second SS Burst Set on the second carrier relative to a configured transmission time of the second SS Burst Set; or when the terminal receives a second time offset, performing, by the terminal, the rate matching on a second carrier based on the second time offset.

Optionally, a length of the first time offset is X bits, and a maximum value of the first time offset is a time length of $$\left\lceil \frac{M}{N} \times 2^{K-X} \right\rceil$$

SSBs, where M represents a maximum time offset of the first SS Burst Set, N represents a time length of the first SS Burst Set, and $2^K$ represents a maximum quantity of SSBs that can be transmitted in one SS Burst Set window by a communications system to which the network device and the terminal belong.

According to a third aspect, this application provides a communication method, including: performing, by a plurality of first antennas of a network device, listen before talk LBT on a first carrier, and determining, by the network device, a first time offset when at least one first antenna completes the LBT, where the plurality of first antennas are configured to send, on the first carrier, synchronization signal blocks SSBs of a first synchronization signal burst set SS Burst Set, and the first time offset is a time offset of an actual transmission time of the first SS Burst Set on the first carrier relative to a configured transmission time of the first SS Burst Set; and sending, by the network device, the first time offset to a terminal.

Beneficial effects of this application include: According to the method, the terminal may determine the actual transmission time of the first SS Burst Set based on the first time offset, to perform rate matching and accurately parse downlink data, thereby improving the reliability of the communications system.

Optionally, the method further includes: sending, by the network device, first indication information to the terminal, where the first indication information is used to indicate whether the plurality of first antennas separately complete the LBT when sending the SSBs of the first SS Burst Set, or the first indication information is used to indicate whether the SSBs of the first SS Burst Set are successfully sent.

Beneficial effects of this application include: According to the method, the terminal may determine, based on the first indication information, which SSBs are successfully sent and which SSBs are not successfully sent, to accurately implement the rate matching, thereby improving the reliability of the communications system.

Optionally, the method further includes: if an SSB corresponding to a second antenna is not successfully sent, sending, by the network device, downlink data to the terminal by using a time-frequency resource of the SSB corresponding to the second antenna, where the second antenna is any one of the first antennas.

Beneficial effects of this application include: According to the method, resource utilization may be improved.

Optionally, the method further includes: performing, by a plurality of third antennas of the network device, the LBT on a second carrier, and determining, by the network device, a second time offset when at least one third antenna completes the LBT, where the plurality of third antennas are configured to send SSBs of a second SS Burst Set, and the second time offset is a time offset of an actual transmission time of the second SS Burst Set on the second carrier relative to a configured transmission time of the second SS Burst Set; and if there is a first preset relationship between the second time offset and the first time offset, skipping sending, by the network device, the second time offset; or if there is no first preset relationship between the second time offset and the first time offset, sending, by the network device, the second time offset.

Beneficial effects of this application include: If there is a first preset relationship between the second time offset and the first time offset, the network device skips sending the second time offset to the terminal, so that the terminal implements the rate matching, thereby reducing system signaling overheads.

Optionally, the first preset relationship is that the second time offset is the same as the first time offset, or there is a fixed time interval between the first time offset and the second time offset.

Optionally, if there is a second preset relationship between LBT statuses that the plurality of third antennas have when the plurality of third antennas send the SSBs of the second SS Burst Set and LBT statuses that the plurality of first antennas have when the plurality of first antennas send the SSBs of the first SS Burst Set, and the LBT statuses are that the LBT is completed or the LBT is not completed, the first indication information is further used to indicate whether the plurality of third antennas separately complete the LBT when sending the SSBs of the second SS Burst Set, or the first indication information is further used to indicate whether the SSBs of the second SS Burst Set are successfully sent; or if there is no second preset relationship between LBT statuses that the plurality of third antennas have when the plurality of third antennas send the SSBs of the first SS Burst Set and LBT statuses that the plurality of first antennas have when the plurality of first antennas send the SSBs of the first SS Burst Set, the network device sends second indication information to the terminal, where the second indication information is used to indicate whether the plurality of third antennas separately complete the LBT when sending the SSBs of the second SS Burst Set, or the second indication information is used to indicate whether the SSBs of the second SS Burst Set are successfully sent.

Beneficial effects of this application include: If the SSBs of the second SS Burst Set are sent by the plurality of third antennas, and there is a second preset relationship between the LBT statuses that the plurality of third antennas have when the plurality of third antennas send the SSBs of the first SS Burst Set and the LBT statuses that the plurality of first antennas have when the plurality of first antennas send the SSBs of the first SS Burst Set, the first indication information is further used to indicate the LBT statuses that the plurality of third antennas have when the plurality of third antennas send the SSBs of the second SS Burst Set, or the first indication information is further used to indicate whether the SSBs of the second SS Burst Set are successfully sent, in other words, the network device does not need to send the second indication information, thereby reducing system signaling overheads.

Optionally, the second preset relationship is that the LBT statuses that the plurality of third antennas have when the plurality of third antennas send the SSBs of the first SS Burst Set are the same as the LBT statuses that the plurality of first antennas have when the plurality of first antennas send the SSBs of the first SS Burst Set, or there is a fixed correspondence between the LBT statuses that the plurality of third antennas have when the plurality of third antennas send the SSBs of the first SS Burst Set and the LBT statuses that the plurality of first antennas have when the plurality of first antennas send the SSBs of the first SS Burst Set.

Optionally, a length of the first time offset is X bits, and a maximum value of the first time offset is a time length of $$\left\lceil \frac{M}{N} \times 2^{K-X} \right\rceil$$

SSBs, where M represents a maximum time offset of the first SS Burst Set, N represents a time length of the first SS Burst Set, and $2^K$ represents a maximum quantity of SSBs that can be transmitted in one SS Burst Set window by a communications system to which the network device and the terminal belong.

Optionally, a length of the first indication information is Y bits, each of the Y bits is used to represent LBT statuses of $$\left\lceil \frac{Z}{Y} \right\rceil$$

first antennas, where Z represents a quantity of the plurality of first antennas.

The following describes a communication method on a terminal side. Effects of the communication method are the same as technical effects of the third aspect and optional manners of the third aspect. Details about the technical effects are not described below again.

According to a fourth aspect, this application provides a communication method, including: receiving, by a terminal, a first time offset sent by a network device, where the first time offset is a time offset of an actual transmission time of a first synchronization signal burst set SS Burst Set on a first carrier relative to a configured transmission time of the first SS Burst Set; and performing, by the terminal, rate matching on the first carrier based on the first time offset.

Optionally, the method further includes: receiving, by the terminal, first indication information sent by the network device, where the first indication information is used to indicate whether a plurality of first antennas separately complete LBT when sending SSBs of the first SS Burst Set, or the first indication information is used to indicate whether SSBs of the first SS Burst Set are successfully sent.

Optionally, the method further includes: if the first indication information indicates that a second antenna does not complete the LBT when sending the SSBs of the first SS Burst Set, or the first indication information indicates that an SSB corresponding to the second antenna is not successfully sent, receiving, by the terminal, downlink data by using a time-frequency resource of the SSB corresponding to the second antenna, where the second antenna is any one of the first antennas.

Optionally, the method further includes: when the terminal does not receive a second time offset, performing, by the terminal, the rate matching on a second carrier based on the first time offset, where the second time offset is a time offset of an actual transmission time of a second SS Burst Set on the second carrier relative to a configured transmission time of the second SS Burst Set; or when the terminal receives a second time offset, performing, by the terminal, the rate matching on a second carrier based on the second time offset.

Optionally, the first indication information is further used to indicate whether a plurality of third antennas complete the LBT when sending SSBs of the second SS Burst Set, or the first indication information is further used to indicate whether SSBs of the second SS Burst Set are successfully sent; or the terminal receives second indication information sent by the network device, where the second indication information is used to indicate whether a plurality of third antennas separately complete the LBT when sending SSBs of the second SS Burst Set, or the second indication information is used to indicate whether SSBs of the second SS Burst Set are successfully sent.

The following provides several communications apparatuses. Content and effects of the communications apparatuses correspond to content and effects of the foregoing method. Details about the content and technical effects are not described below again.

According to a fifth aspect, this application provides a communications apparatus, including: a processing module, configured to: perform listen before talk LBT on a first carrier, and determine a first time offset when the LBT is completed, where the first carrier is used to send a first synchronization signal burst set SS Burst Set, and the first time offset is a time offset of an actual transmission time of the first SS Burst Set on the first carrier relative to a configured transmission time of the first SS Burst Set; and a transmit module, configured to send the first time offset to a terminal.

According to a sixth aspect, this application provides a communications apparatus, including: a receive module, configured to receive a first time offset sent by a network device, where the first time offset is a time offset of an actual transmission time of a first synchronization signal burst set SS Burst Set on a first carrier relative to a configured transmission time of the first SS Burst Set; and a rate matching module, configured to perform rate matching on the first carrier based on the first time offset.

According to a seventh aspect, this application provides a communications apparatus, including: a plurality of first antennas, configured to send, on a first carrier, synchronization signal blocks SSBs of a first synchronization signal burst set SS Burst Set; a processing module, configured to: determine a first time offset when at least one first antenna completes LBT, where the first time offset is a time offset of an actual transmission time of the first SS Burst Set on the first carrier relative to a configured transmission time of the first SS Burst Set; and a transmit module, configured to send the first time offset to a terminal.

According to an eighth aspect, this application provides a communications apparatus, including: a receive module, configured to receive a first time offset sent by a network device, where the first time offset is a time offset of an actual transmission time of a first synchronization signal burst set SS Burst Set on a first carrier relative to a configured transmission time of the first SS Burst Set; and a rate matching module, configured to perform rate matching on the first carrier based on the first time offset.

According to a ninth aspect, this application provides a communications device, including: a memory, a processor, and a transceiver, where the memory is configured to store an instruction; and the processor is configured to: execute the instruction to implement some method steps in the first aspect or optional manners of the first aspect, and control the transceiver to perform some method steps in the first aspect or the optional manners of the first aspect.

According to a tenth aspect, this application provides a communications device, including: a memory, a processor, and a transceiver, where the memory is configured to store an instruction; and the processor is configured to: execute the instruction to implement some method steps in the second aspect or optional manners of the second aspect, and control the transceiver to perform some method steps in the second aspect or the optional manners of the second aspect.

According to an eleventh aspect, this application provides a communications device, including: a memory, a processor, and a transceiver, where the memory is configured to store an instruction; and the processor is configured to: execute the instruction to implement some method steps in the third aspect or optional manners of the third aspect, and control the transceiver to perform some method steps in the third aspect or the optional manners of the third aspect.

According to a twelfth aspect, this application provides a communications device, including: a memory, a processor, and a transceiver, where the memory is configured to store an instruction; and the processor is configured to: execute the instruction to implement some method steps in the fourth aspect or optional manners of the fourth aspect, and control the transceiver to perform some method steps in the fourth aspect or the optional manners of the fourth aspect.

According to a thirteenth aspect, this application provides a computer storage medium, where the storage medium includes a computer instruction; and when the instruction is executed by a computer, the computer is enabled to implement the method in the first aspect or optional manners of the first aspect.

According to a fourteenth aspect, this application provides a computer storage medium, where the storage medium includes a computer instruction; and when the instruction is executed by a computer, the computer is enabled to implement the method in the second aspect or optional manners of the second aspect.

According to a fifteenth aspect, this application provides a computer storage medium, where the storage medium includes a computer instruction; and when the instruction is executed by a computer, the computer is enabled to implement the method in the third aspect or optional manners of the third aspect.

According to a sixteenth aspect, this application provides a computer storage medium, where the storage medium includes a computer instruction; and when the instruction is executed by a computer, the computer is enabled to implement the method in the fourth aspect or optional manners of the fourth aspect.

According to a seventeenth aspect, this application provides a computer program product, where the computer program product includes an instruction; and when the computer program is executed by a computer, the instruction enables the computer to perform the method in the first aspect or optional manners of the first aspect.

According to an eighteenth aspect, this application provides a computer program product, where the computer program product includes an instruction; and when the computer program is executed by a computer, the instruction enables the computer to perform the method in the second aspect or optional manners of the second aspect.

According to a nineteenth aspect, this application provides a computer program product, where the computer program product includes an instruction; and when the computer program is executed by a computer, the instruction enables the computer to perform the method in the third aspect or optional manners of the third aspect.

According to a twentieth aspect, this application provides a computer program product, where the computer program product includes an instruction; and when the computer program is executed by a computer, the instruction enables the computer to perform the method in the fourth aspect or optional manners of the fourth aspect.

This application provides a communications method, apparatus, and device, and a storage medium. The method includes: performing, by a network device, LBT on a first carrier, and determining a first time offset when the LBT is completed, where the first carrier is used to send a first synchronization signal burst set SS Burst Set, and the first time offset is a time offset of an actual transmission time of the first SS Burst Set on the first carrier relative to a configured transmission time of the first SS Burst Set; and sending, by the network device, the first time offset to a terminal. According to the method, the terminal may determine the actual transmission time of the first SS Burst Set based on the first time offset, to perform the rate matching and accurately parse downlink data, thereby improving reliability of a communications system

DETAILED DESCRIPTION OF ILLUSTRATIVE EMBODIMENTS

Figure 1:
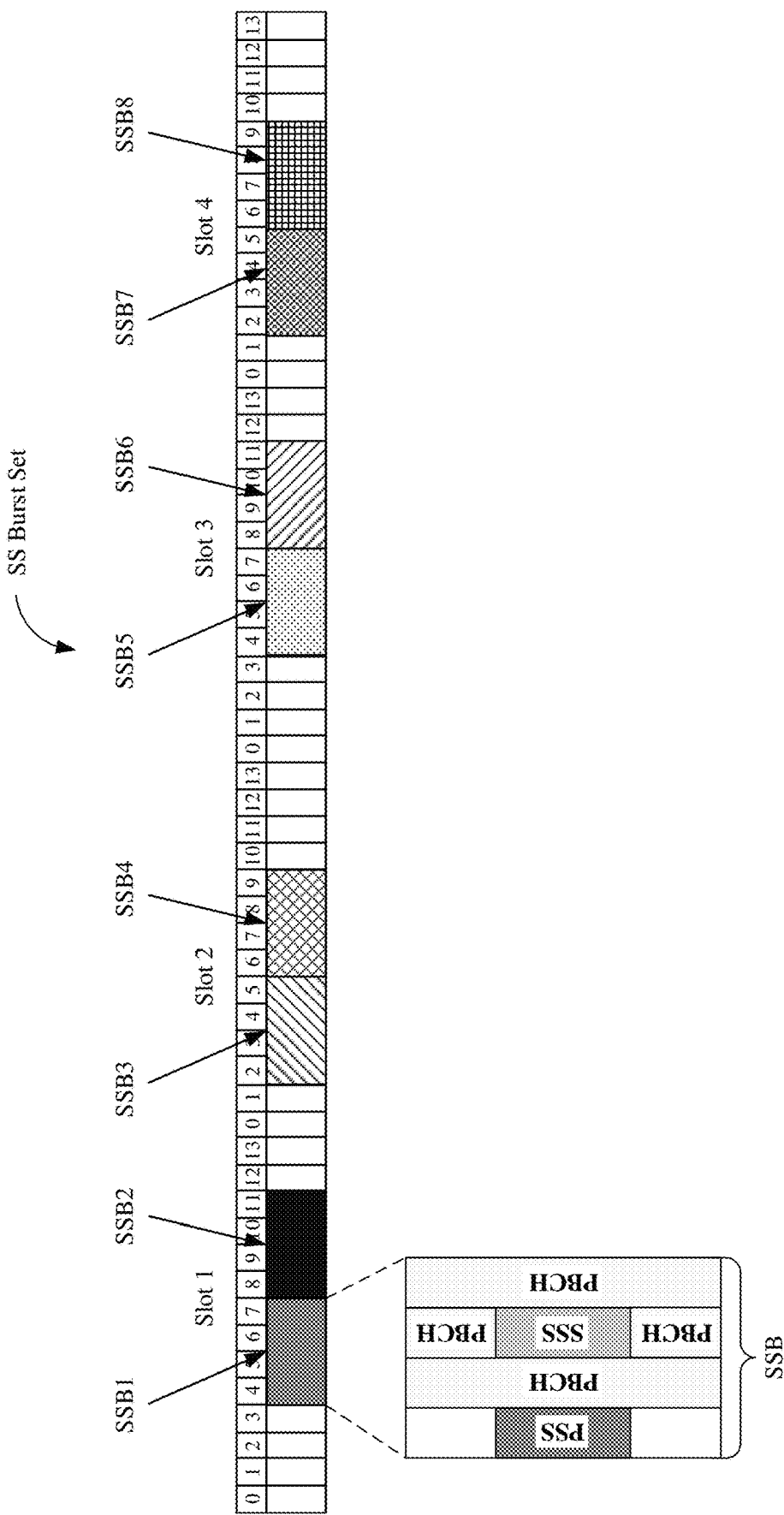
FIG. 1 is a schematic diagram of an SS Burst Set according to the prior art.
Figure 2:
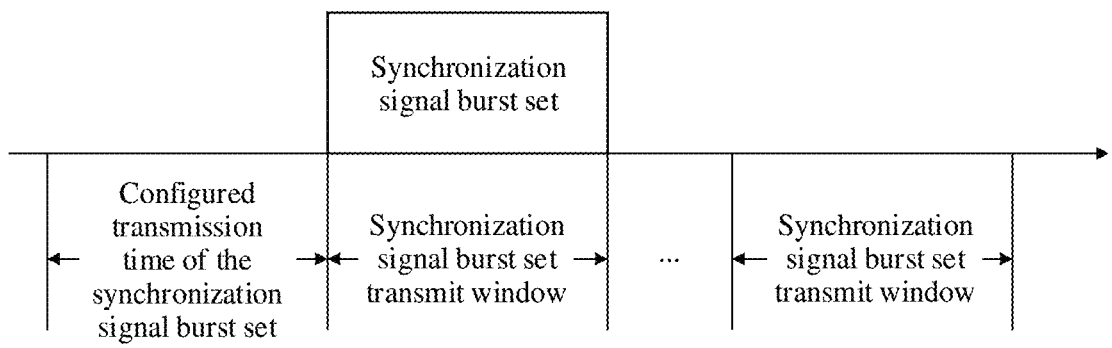
FIG. 2 is a schematic diagram of a manner of sending an SS Burst Set based on an LBT mechanism according to an embodiment of this application.
Figure 3:
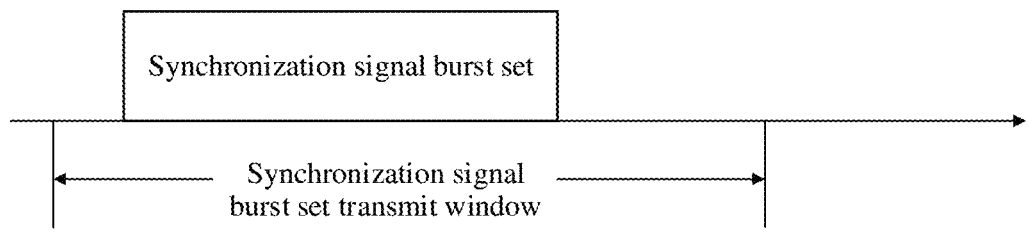
FIG. 3 is a schematic diagram of a manner of sending an SS Burst Set based on an LBT mechanism according to another embodiment of this application.

On an unlicensed band, an LBT channel contention access mechanism is usually used. FIG. 2 is a schematic diagram of a manner of sending an SS Burst Set based on an LBT mechanism according to an embodiment of this application. As shown in FIG. 2, several SS Burst Set transmit windows may be defined in a standard. When a network device cannot send the SS Burst Set at a configured transmission time of the SS Burst Set, the network device attempts to send the SS Burst Set in an SS Burst Set transmit window that exists after the configured transmission time. FIG. 3 is a schematic diagram of a manner of sending an SS Burst Set based on an LBT mechanism according to another embodiment of this application. As shown in FIG. 3, a large SS Burst Set transmit window may be defined in the standard. When the network device cannot send the SS Burst Set at the configured transmission time of the SS Burst Set, the network device may begin to send the SS Burst Set at any moment after LBT is completed. In conclusion, due to impact of the LBT, the network device may not be able to send the SS Burst Set at the configured transmission time of the SS Burst Set, and when a terminal still performs rate matching based on the configured transmission time, the terminal may not accurately obtain a time-frequency resource of downlink data, and cannot accurately parse the downlink data. Consequently, reliability of a communications system is reduced.

Figure 4:
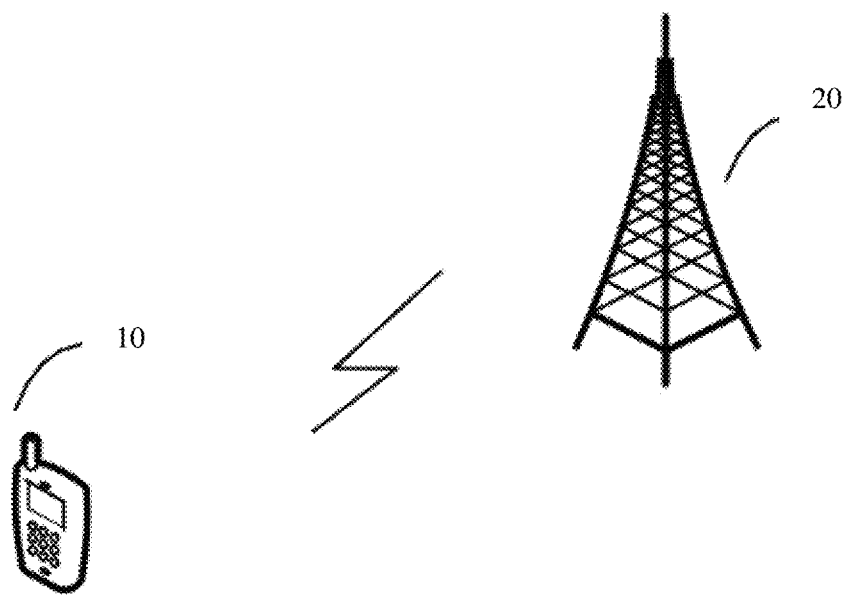
FIG. 4 is a diagram of an application scenario of a technical solution of this application according to an embodiment of this application.

To resolve the foregoing technical problems, this application provides a communications method, apparatus, and device, and a storage medium. FIG. 4 is a diagram of an application scenario of a technical solution of this application according to an embodiment of this application. For clarity, FIG. 4 shows only one terminal 10 and one network device 20. Actually, more terminals 10 and network devices 20 may be further included. The terminal 10 and the network device 20 communicate with each other by using a wireless interface.

It should be noted that the network device in this application may be a base transceiver station (BTS) in a global system for mobile communications (GSM) or code division multiple access (CDMA), a NodeB (NB) in wideband code division multiple access (WCDMA), an evolved NodeB (eNB) in long term evolution (LTE) or enhanced long term evolution (eLTE), a next generation-evolved NodeB (ng-eNB), an access point (AP) or a relay node in a WLAN, a gNB in an NR, or the like. This is not limited herein.

In addition, the terminal in this application may be a device that provides a user with voice and/or data connectivity, a handheld device with a wireless connection function, or another processing device connected to a wireless modem. The terminal may also be referred to as a "terminal device". The terminal may communicate with at least one core network by using a radio access network (Radio Access Network, RAN). The terminal may be a mobile terminal, for example, a mobile phone (or referred to as a "cellular" phone), and a computer that has a mobile terminal. For example, the terminal may be a portable, pocket-size, handheld, computer built-in or vehicle-mounted mobile apparatus, which exchanges voice and/or data with the radio access network. The terminal may also be referred to as a subscriber unit (Subscriber Unit), a subscriber station (Subscriber Station), a mobile station (Mobile Station), a mobile console, a remote station, an access point, a remote terminal, an access terminal, a user terminal, a user agent, or user equipment. This is not limited herein.

Embodiment 1

Based on the application scenario in FIG. 4, further, the communication method provided in this embodiment may be applicable to the following scenario: A network device sends, on a first carrier, an SS Burst Set by using one antenna, or the network device sends, on the first carrier, the SS Burst Set by using a plurality of antennas, where all of the plurality of antennas have a same LBT state at each moment. For example, all of the plurality of antennas complete LBT at a moment, or do not complete the LBT at a moment. It should be noted that the antenna described in this application may be an antenna panel.

Figure 5:
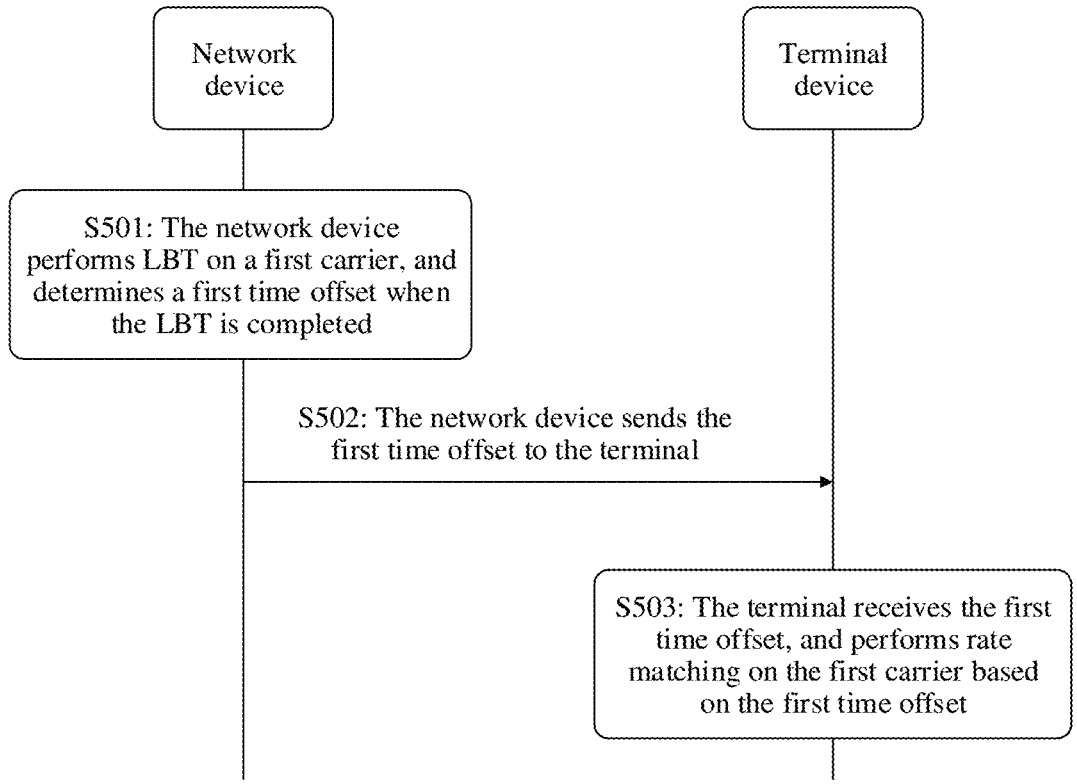
FIG. 5 is an interactive flowchart of a communication method according to an embodiment of this application.

FIG. 5 is an interactive flowchart of a communication method according to an embodiment of this application. As shown in FIG. 5, the method includes the following steps.

Step S501: A network device performs LBT on a first carrier, and determines a first time offset when the LBT is completed.

Step S502: The network device sends the first time offset to a terminal.

Step S503: The terminal receives the first time offset, and performs rate matching on the first carrier based on the first time offset.

Step S501 is described as follows.

In an application scenario of an unlicensed band, the network device first performs the LBT on the first carrier, to send a first SS Burst Set. The first SS Burst Set includes one or more SSBs. The network device sends the SSBs by using a same antenna or a plurality of antennas. As described above, when the SSBs are sent by using the plurality of antennas, LBT statuses of the antennas are always consistent. An example in which the network device performs the LBT on the first carrier is used. When the network device does not complete the LBT on the first carrier, the network device cannot send the first SS Burst Set, and the LBT needs to be started in a next periodicity. When the network device completes the LBT on the first carrier, the network device may send the first SS Burst Set. Because the LBT needs to consume specific time, it may be understood that the network device can send the first SS Burst Set only when completing the LBT, which causes an offset existing between an actual transmission time of the first SS Burst Set and a configured transmission time of the first SS Burst Set. The "configured transmission time of the first SS Burst Set" refers to a transmission time configured by the network device for the first SS Burst Set.

When completing the LBT, the network device determines the first time offset, where the first time offset is a time offset of the actual transmission time of the first SS Burst Set on the first carrier relative to the configured transmission time of the first SS Burst Set. For example, in another embodiment, the first time offset may alternatively be a time offset of actual transmission times of one or more SSBs in the first SS Burst Set on the first carrier relative to configured transmission times of the one or more SSBs in the first SS Burst Set.

Optionally, if a length of the first time offset is X bits, a maximum value of the first time offset is a time length of $$\left\lceil \frac{M}{N} \times 2^{K-X} \right\rceil$$

SSBs. For example, each SSB lasts for four OFDM symbols. In this case, a time length of the SSB is four OFDM symbols. It should be noted that the time length of the SSB is not limited to four OFDM symbols. Further, M represents a maximum time offset of the first SS Burst Set, and the maximum time offset is a maximum time offset configured by the network device for the first SS Burst Set, and N represents a time length of the first SS Burst Set. Usually, both M and N are in a unit of millisecond (ms). $2^K$ represents a maximum quantity of SSBs that can be transmitted in one SS Burst Set window by a communications system to which the network device and the terminal belong. For example, if both X and K are 6, and both M and N are 5 ms, the first time offset is a time length of one SSB.

Further, in this embodiment, how to determine the first time offset is described by using the following example:

FIG. 6A to FIG. 6D are schematic diagrams of a plurality of manners of sending a first SS Burst Set based on an LBT mechanism according to an embodiment of this application. The sending manner may also be embodied in a form of "pattern". The first SS Burst Set may include 4, 8, or 64 SSBs. In this embodiment of this application, for example, the first SS Burst Set includes four SSBs (an SSB1, an SSB2, an SSB3, and an SSB4) is used. For a case in which the first SS Burst Set includes 8 or 64 SSBs, refer to the case in which the first SS Burst Set includes four SSBs.

Figure 6A:
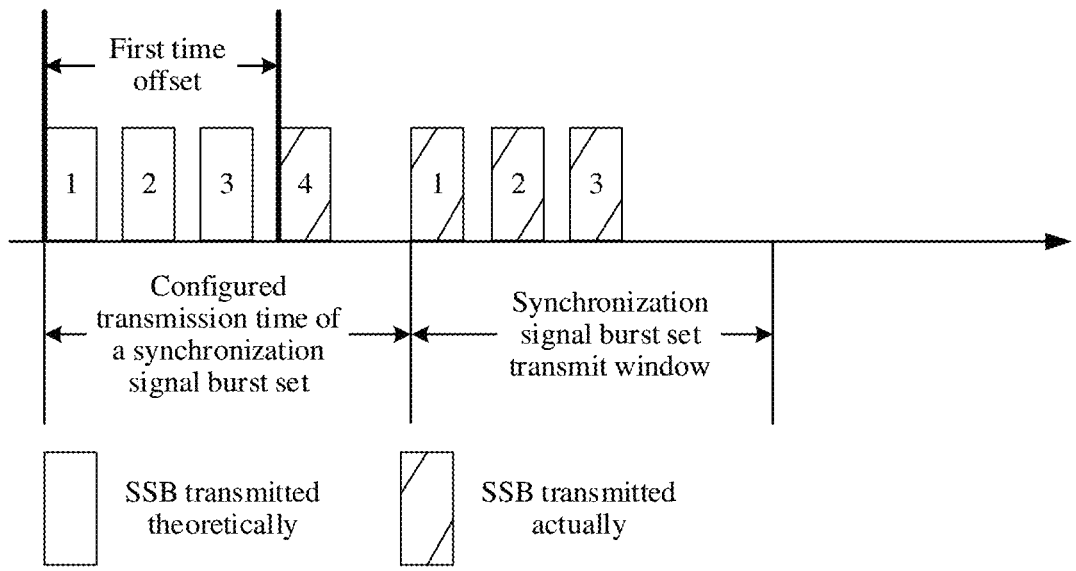
FIG. 6A to FIG. 6D are schematic diagrams of a plurality of manners of sending a first SS Burst Set based on an LBT mechanism according to an embodiment of this application.

Specifically, as shown in FIG. 6A, at a configured transmission time of the SSB3 and before the configured transmission time of the SSB3, the network device does not complete the LBT on the first carrier, and at a configured transmission time of the SSB4, the network device completes the LBT on the first carrier. Therefore, the network device normally sends the SSB4 at the configured transmission time of the SSB4, and then sends remaining SSBs in a next SS Burst Set window. For example, the network device sends the SSB1, the SSB2, and the SSB3 in the example. In this case, the first time offset is a difference between the configured transmission time of the SSB4 and a configured transmission time of the SSB1.

Figure 6B:
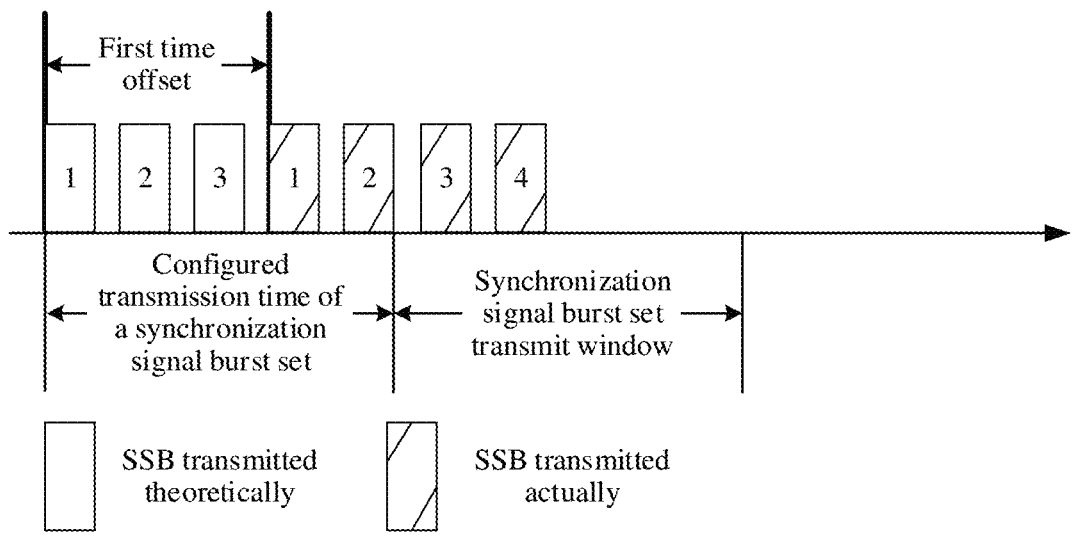

As shown in FIG. 6B, at the configured transmission time of the SSB3 and before the configured transmission time of the SSB3, the network device does not complete the LBT on the first carrier, and at the configured transmission time of the SSB4, the network device completes the LBT on the first carrier. In this case, the network device sequentially sends all SSBs starting from the configured transmission time of the SSB4. For example, the network device sends the SSB1, the SSB2, the SSB3, and the SSB4 in the example. In this case, the first time offset is a difference between an actual transmission time of the SSB1 and the configured transmission time of the SSB1.

Figure 6C:
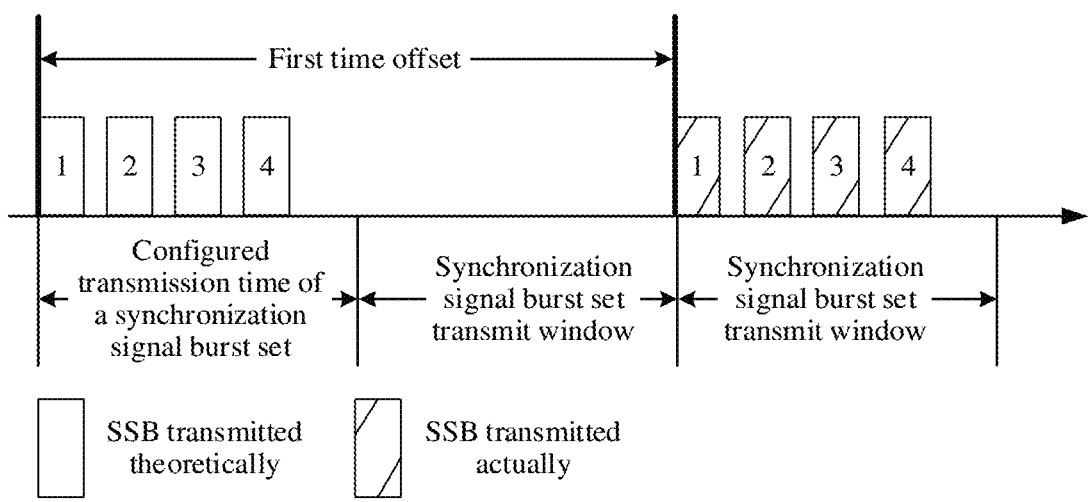

As shown in FIG. 6C, at a transmission time of the SSB4 and before the transmission time of the SSB4, the network device does not complete the LBT on the first carrier, and at transmission time that is of an SSB in a second SS Burst Set transmit window and that is after a configured transmission time of the SS Burst Set, the network device completes the LBT on the first carrier. In this case, the first time offset is a difference between the actual transmission time of the SSB1 and the configured transmission time of the SSB1.

Figure 6D:
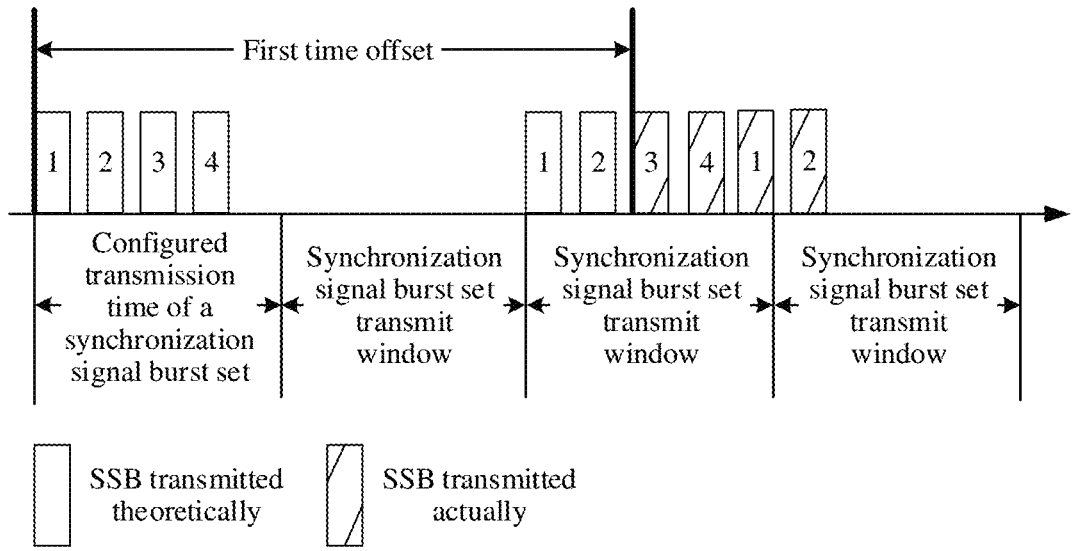

As shown in FIG. 6D, at the transmission time of the SSB4 and before the transmission time of the SSB4, the network device does not complete the LBT on the first carrier, and at a transmission time that is of the SSB3 in the second SS Burst Set transmit window and that is after the configured transmission time of the SS Burst Set, the network device completes the LBT on the first carrier. In this case, the first time offset is a difference between an actual transmission time of the SSB3 and the configured transmission time of the SSB1.

Step S502 is described as follows: That the network device sends the first time offset to a terminal includes: sending, by the network device, downlink control information (DCI) to the terminal, where the first time offset may be carried in the DCI, and the DCI may be UE-specific DCI or group-common DCI. How the network device sends the first time offset is not limited in this application.

Step S503 is described as follows: The terminal receives the first time offset coming from the network device, and performs rate matching based on the first time offset. The "rate matching" means that bits on a transmission channel are repeatedly sent or punctured to match a bearer capability of a physical channel, and reach a bit rate required by a transport format during channel mapping. In this application, the network device may send the DCI to the terminal, where the DCI is used to indicate a configured transmission time of downlink data and the configured transmission time of the first SS Burst Set. The terminal may determine an actual transmission time of the downlink data based on the obtained first time offset, the configured transmission time of the downlink data, and the configured transmission time of the first SS Burst Set, to decode the downlink data. The downlink data may be physical downlink shared channel (PDSCH) data, a channel state information-reference signal (CSI-RS), or a tracking reference signal (TRS). The "configured transmission time of the downlink data" is a transmission time configured by the network device for the downlink data.

Specifically, a prerequisite of the foregoing rate matching process is that the network device and the terminal know a sending manner of the first SS Burst Set. For example, the known sending manner of the first SS Burst Set may be shown in FIG. 6A: A first antenna normally sends the SSB4 at the configured transmission time of the SSB4, and then sends the SSB1, the SSB2, and the SSB3 in a next SS Burst Set window. Alternatively, as shown in FIG. 6B, the first antenna sequentially sends the SSB1, the SSB2, the SSB3, and the SSB4 starting from the configured transmission time of the SSB4.

Figure 7A:
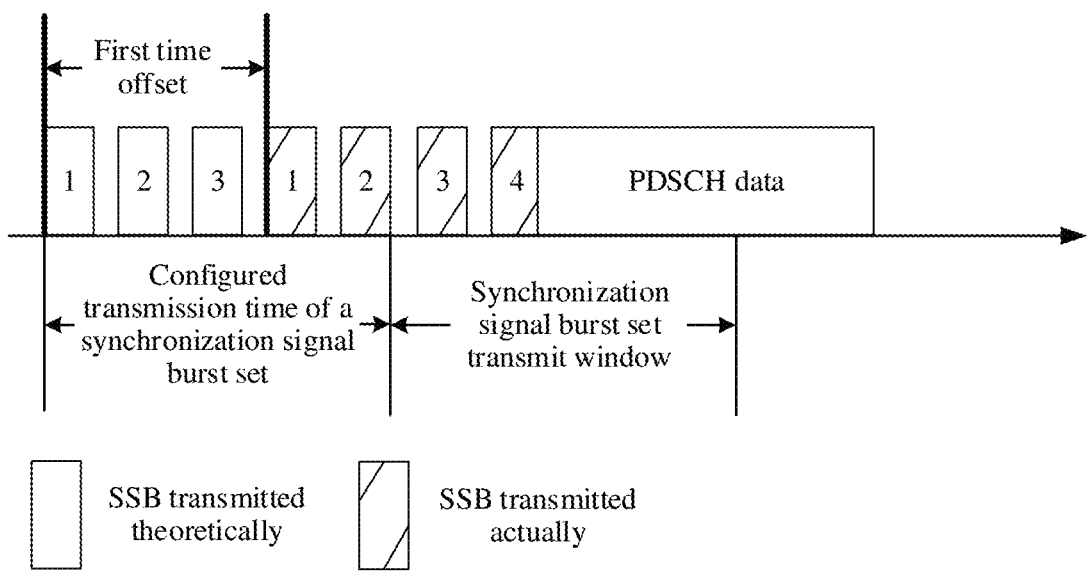
FIG. 7A is a schematic diagram of an actual transmission time of downlink data and an actual transmission time of a first SS Burst Set corresponding to FIG. 6A according to an embodiment of this application.
Figure 7B:
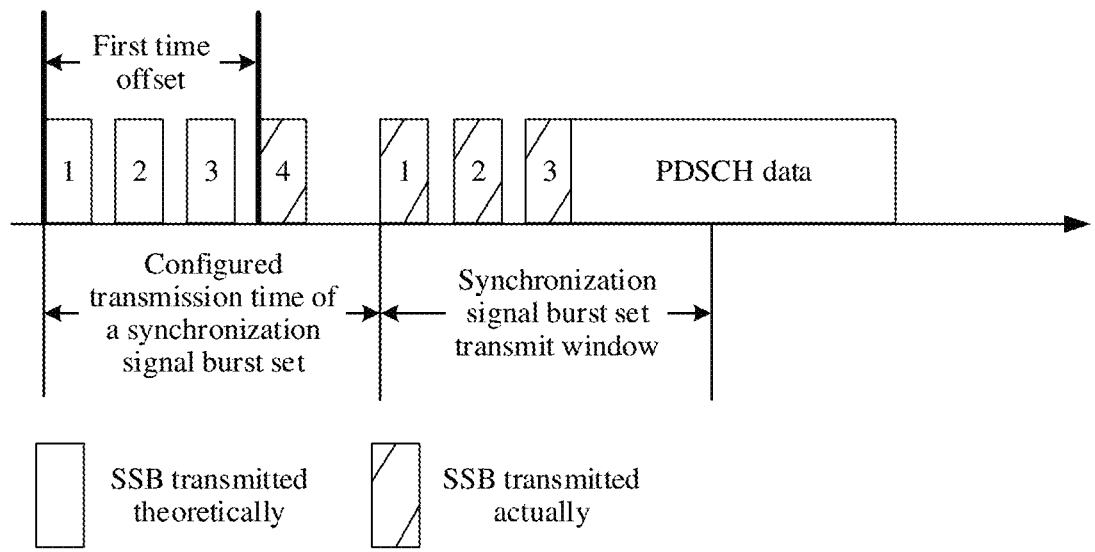
FIG. 7B is a schematic diagram of an actual transmission time of downlink data and an actual transmission time of a first SS Burst Set corresponding to FIG. 6B according to an embodiment of this application.

The rate matching process of the terminal device is specifically as follows: FIG. 7A is a schematic diagram of an actual transmission time of downlink data and an actual transmission time of a first SS Burst Set corresponding to FIG. 6A according to an embodiment of this application. As shown in FIG. 7A, when the first SS Burst Set has the first time offset, the terminal determines the actual transmission time of the first SS Burst Set based on the configured transmission time of the first SS Burst Set and the first time offset. It is assumed that the network device specifies that the network device immediately sends the downlink data after sending the first SS Burst Set, in other words, the actual transmission time of the first SS Burst Set is close to the actual transmission time of the downlink data. Based on this case, the terminal device may determine the actual transmission time of the downlink data, to accurately parse the downlink data. FIG. 7B is a schematic diagram of an actual transmission time of downlink data and an actual transmission time of a first SS Burst Set corresponding to FIG. 6B according to an embodiment of this application. As shown in FIG. 7B, when the first SS Burst Set has the first time offset, the terminal determines the actual transmission time of the first SS Burst Set based on the configured transmission time of the first SS Burst Set and the first time offset. Because the network device specifies that the network device immediately sends the downlink data after sending the first SS Burst Set, it may be learned that the actual transmission time of the downlink data is close to the actual transmission time of the first SS Burst Set. Based on this case, the terminal device may determine the actual transmission time of the downlink data, to accurately parse the downlink data. It should be noted that because manners of sending the first SS Burst Set shown in FIG. 6A and FIG. 6B are different, the determined actual transmission time of the downlink data is also different.

When the network device and the terminal do not know the sending manner of the first SS Burst Set, the network device further needs to send indication information of the sending manner to the terminal. The indication information of the sending manner is used to indicate the sending manner of the first SS Burst Set. For example, the indication information of the sending manner is used to indicate the network device to use the sending manner shown in FIG. 6A or the sending manner shown in FIG. 6B. Based on this case, after the terminal determines the sending manner of the first SS burst Set, the terminal determines the actual transmission time of the first SS Burst Set based on the configured transmission time of the first SS Burst Set and the first time offset. It is assumed that the network device specifies that the network device immediately sends the downlink data after sending the first SS Burst Set, in other words, the actual transmission time of the first SS Burst Set is close to the actual transmission time of the downlink data. For example, when the terminal determines, based on the indication information of the sending manner, that the sending manner of the first SS Burst Set is the sending manner in FIG. 6A, the terminal determines the actual transmission time of the downlink data, as shown in FIG. 7A. When the terminal determines, based on the indication information of the sending manner, that the sending manner of the first SS Burst Set is the sending manner in FIG. 6B, the terminal determines the actual transmission time of the downlink data, as shown in FIG. 7B.

In conclusion, this application provides a communication method, including: performing, by the network device, the LBT on the first carrier, and determining the first time offset when the LBT is completed; sending, by the network device, the first time offset to the terminal; and receiving, by the terminal, the first time offset, and performing the rate matching based on the first time offset, where the first time offset is a time offset of the actual transmission time of the first SS Burst Set on the first carrier relative to the configured transmission time of the first SS Burst Set. According to the method, the terminal may determine the actual transmission time of the first SS Burst Set based on the first time offset, to perform the rate matching and accurately parse the downlink data, thereby improving reliability of the communications system.

Embodiment 2

Figure 8:
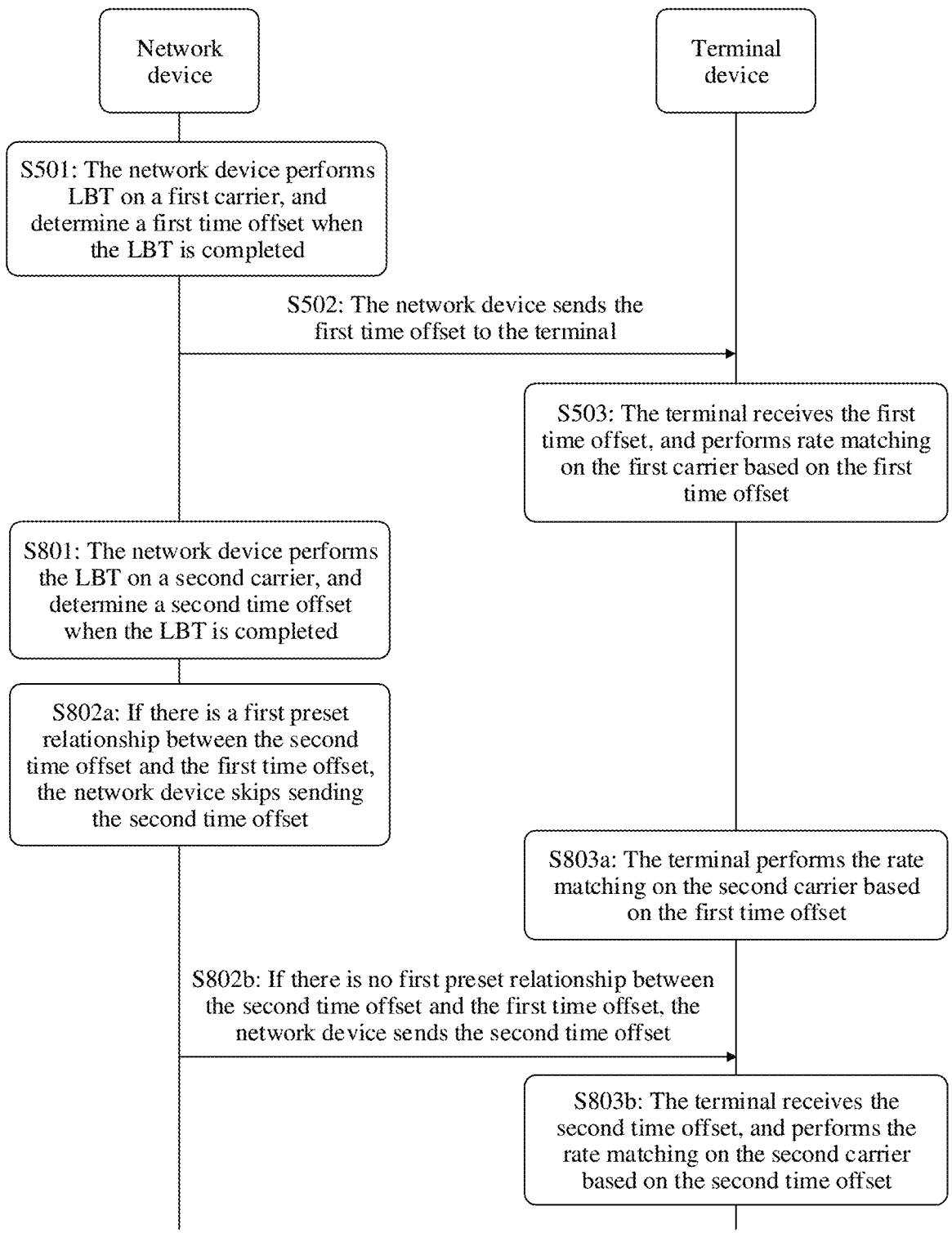
FIG. 8 is an interactive flowchart of a communication method according to an embodiment of this application.

Embodiment 1 describes the communication method by using a single carrier as an example. Actually, this application further has a multi-carrier application scenario. For example, a first carrier is a primary channel, and a corresponding first SS Burst Set is used for random access, channel measurement feedback, and the like; a second carrier is a secondary channel, and a corresponding second SS Burst Set is used for the channel measurement feedback. The second carrier may be a carrier that is known by a terminal device and a network device and that is used to transmit the second SS Burst Set. Alternatively, before the network device sends an SS Burst Set, the network device sends carrier indication information to the terminal device, where the carrier indication information is used to indicate that the carrier used to transmit the second SS Burst Set is the second carrier. The following describes a multi-carrier-based communication method. Specifically, based on Embodiment 1, FIG. 8 is an interactive flowchart of a communication method according to an embodiment of this application. As shown in FIG. 8, the method further includes the following steps.

Step S801: A network device performs LBT on a second carrier, and determines a second time offset when the LBT is completed.

Step S802a: If there is a first preset relationship between the second time offset and a first time offset, the network device skips sending the second time offset.

Step S803a: The terminal performs rate matching on the second carrier based on the first time offset.

Step S802b: If there is no first preset relationship between the second time offset and the first time offset, the network device sends the second time offset.

Step S803b: The terminal receives the second time offset, and performs the rate matching on the second carrier based on the second time offset.

A solution including step S802a and step S803a and a solution including step S802b and step S803b are parallel solutions. It should be noted that the solution including step S802a and step S803a and the solution including step S802b and step S803b are optional.

Step S802a to step S803b may be performed after step S502. However, a sequence of step S801 and step S502 is not limited in this embodiment. In FIG. 8, an example in which step S801 is performed after step S503 is used.

Step S801 is described as follows: The second carrier is used to send a second SS Burst Set, and the second time offset is a time offset of an actual transmission time of the second SS Burst Set on the second carrier relative to a configured transmission time of the second SS Burst Set. For example, in another embodiment, the second time offset may alternatively be a time offset of an actual transmission time of one or more SSBs in the second SS Burst Set on a first carrier relative to a configured transmission time of the one or more SSBs in the second SS Burst Set. It should be noted that step S801 is similar to step S501, and for details, refer to step S501. Details are not described in this application again.

Descriptions are made with reference to step S802a and step S803a. For example, the first preset relationship is that the second time offset is the same as the first time offset, or the first preset relationship is that there is a fixed time interval between the first time offset and the second time offset. In this case, the network device does not need to send the second time offset. When the second time offset is the same as the first time offset, the terminal only needs to determine the actual transmission time of the second SS Burst Set based on the first time offset, to accurately perform the rate matching on the second carrier. When there is a fixed time interval between the second time offset and the first time offset, the terminal only needs to determine the actual transmission time of the second SS Burst Set based on the first time offset and the fixed time interval, to accurately perform the rate matching on the second carrier. For the rate matching process performed by the terminal device on the second carrier, refer to step S503. Details are not described in this application again.

Descriptions are made with reference to step S802b and step S803b. It should be noted that if there is no first preset relationship between the second time offset and the first time offset, the network device sends the second time offset to the terminal. The terminal may determine the actual transmission time of the second SS Burst Set based on the second time offset, to accurately perform the rate matching. For the rate matching process performed by the terminal device on the second carrier, refer to step S503. Details are not described in this application again.

In conclusion, in this embodiment, if there is a first preset relationship between the second time offset and the first time offset, the network device skips sending the second time offset to the terminal, so that the terminal implements the rate matching, thereby reducing system signaling overheads.

Embodiment 3

Figure 9:
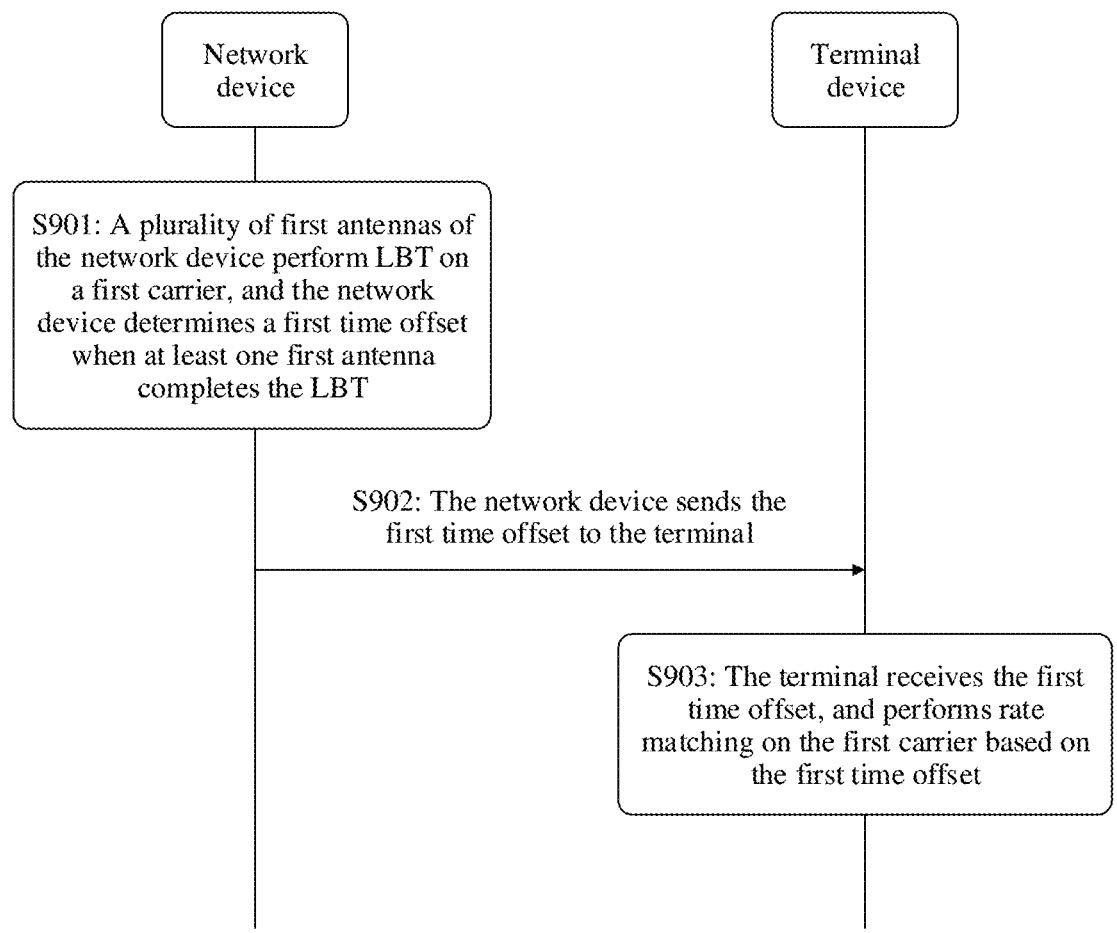
FIG. 9 is an interactive flowchart of a communication method according to an embodiment of this application.

Based on the application scenario in FIG. 4, further, the communication method provided in this embodiment may be applicable to the following scenario: A network device sends, on a first carrier, an SS Burst Set by using a plurality of antennas, where all of the plurality of antennas may have different LBT statuses at each moment. For example, some of the plurality of antennas completes LBT at a moment, and the remaining antennas do not complete the LBT at the moment. Specifically, FIG. 9 is an interactive flowchart of a communication method according to an embodiment of this application. As shown in FIG. 9, the method includes the following steps.

Step S901: A plurality of first antennas of a network device performs LBT on a first carrier, and the network device determines a first time offset when at least one first antenna completes the LBT.

Step S902: The network device sends the first time offset to a terminal.

Step S903: The terminal receives the first time offset, and performs rate matching on the first carrier based on the first time offset.

Figure 10:
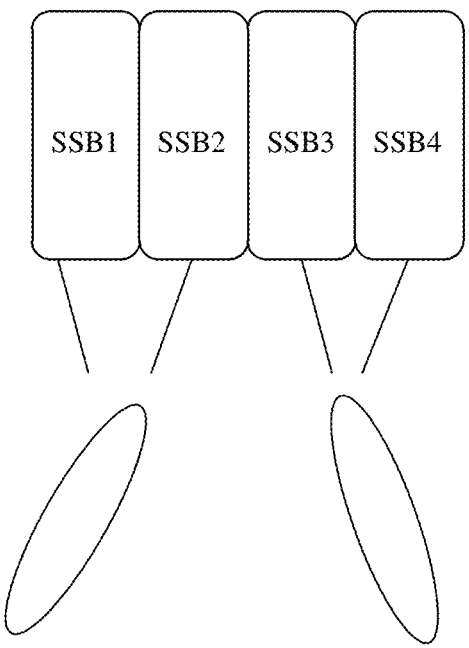
FIG. 10 is a schematic diagram of a correspondence between first antennas and SSBs according to an embodiment of this application.

Step S901 is described as follows:

The plurality of first antennas is configured to send, on the first carrier, SSBs of a first SS Burst Set. For example, FIG. 10 is a schematic diagram of a correspondence between first antennas and SSBs according to an embodiment of this application. As shown in FIG. 10, the plurality of first antennas are separately a first antenna 1 and a first antenna 2. The first antenna 1 is configured to send an SSB1 and an SSB2, and the first antenna 2 is configured to send an SSB3 and an SSB4. The correspondence between first antennas and SSBs may be configured by using remaining system information (Remaining system information, RMSI), open system interconnection (Open System Interconnection, OSI) signaling, or radio resource control (Radio Resource Control, RRC) signaling. The RRC signaling may be UE-specific RRC (UE-specific RRC) signaling, or common RRC (common RRC) signaling.

Further, the first time offset is a time offset of an actual transmission time of the first SS Burst Set on the first carrier relative to a configured transmission time of the first SS Burst Set.

In an application scenario of an unlicensed band, the plurality of first antennas of the network device first performs the LBT on the first carrier, to send the first SS Burst Set. The first SS Burst Set includes a plurality of SSBs, and the network device may separately send the SSBs by using different first antennas. For example, a first antenna performs the LBT on the first carrier, an SSB cannot be sent when the first antenna does not complete the LBT on the first carrier, and the LBT needs to be continued/restarted when the carrier is idle. When the first antenna completes the LBT on the first carrier, the SSB may be sent. Because the LBT needs to consume specific time, it may be understood that each of the first antennas can send the SSB only when completing the LBT, which causes an offset (offset) existing between the actual transmission time of the first SS Burst Set and the configured transmission time of the first SS Burst Set. The "configured transmission time of the first SS Burst Set" refers to a transmission time configured by the network device for the first SS Burst Set.

Optionally, if a length of the first time offset is X bits, a maximum value of the first time offset is a time length of $$\left\lceil \frac{M}{N} \times 2^{K-X} \right\rceil$$

SSBs. For example, each SSB lasts for four OFDM symbols. In this case, a time length of the SSB is four OFDM symbols. It should be noted that the time length of the SSB is not limited to four OFDM symbols. Further, M represents a maximum time offset of the first SS Burst Set, the maximum time offset is a maximum time offset configured by the network device for the first SS Burst Set, and N represents a time length of the first SS Burst Set. Usually, both M and N are in a unit of millisecond (ms). $2^K$ represents a maximum quantity of SSBs that can be transmitted in one SS Burst Set window by a communications system to which the network device and the terminal belong. For example, if both X and K are 6, and both M and N are 5 ms, the first time offset is a time length of one SSB.

Figure 11A:
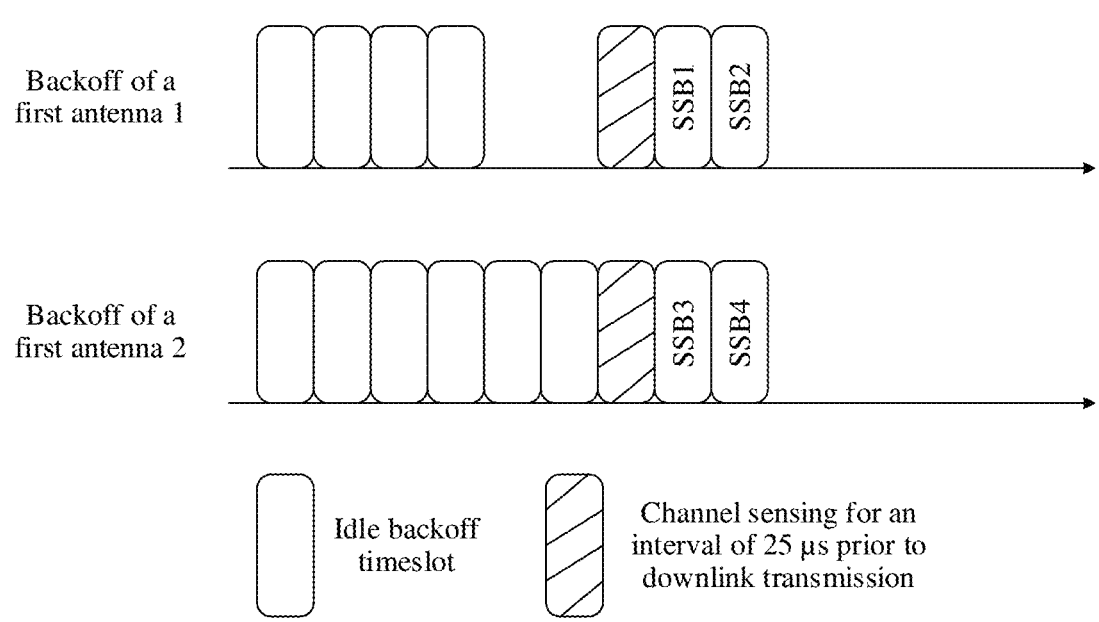
FIG. 11A is a schematic diagram of a manner of sending a first SS Burst Set based on an LBT mechanism according to an embodiment of this application.

Further, in this embodiment, how to determine the first time offset is described by using the following example:

For example, FIG. 11A is a schematic diagram of a manner of sending a first SS Burst Set based on an LBT mechanism according to an embodiment of this application. As shown in FIG. 11A, the first antenna 1 and the first antenna 2 separately select a random number and perform backoff on the first carrier, the first antenna 1 needs to complete four idle backoff slots (idle ECCA slot) to complete the backoff, and the first antenna 2 needs to complete six idle backoff slots (idle ECCA slot) to complete the backoff. After the first antenna 1 implements four idle backoff slots, the first antenna 1 is in a waiting state, to wait for the first antenna 2 to complete six idle backoff slots. Further, after completing the backoff, the first antenna 1 and the second antenna 2 need to perform channel sensing for an interval of 25 µs prior to downlink transmission (perform channel sensing for an interval of 25 µs prior to downlink transmission), to determine whether the first carrier is idle. When it is determined that the first carrier is idle, the first antenna 1 and the first antenna 2 may simultaneously perform SSB transmission on the first carrier. In this case, the network device may determine time at which both the first antenna 1 and the first antenna 2 complete the LBT, calculate a difference between the time and the configured transmission time of the first SS Burst Set, and determine a value greater than or equal to the time difference as the first time offset.

Figure 11B:
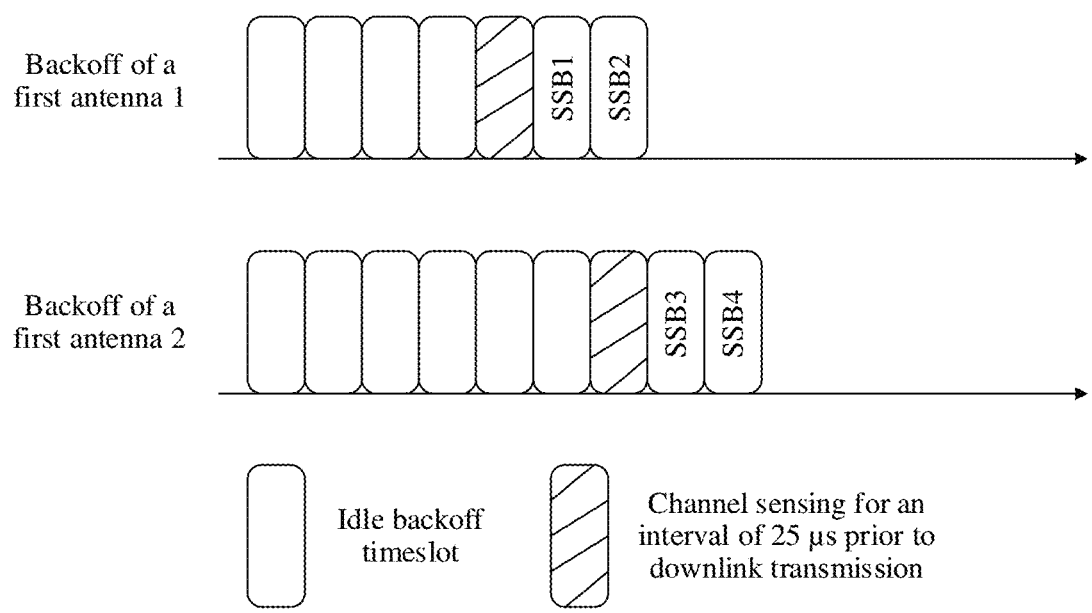
FIG. 11B is a schematic diagram of a manner of sending an SS Burst Set based on an LBT mechanism according to another embodiment of this application.

FIG. 11B is a schematic diagram of a manner of sending an SS Burst Set based on an LBT mechanism according to another embodiment of this application. As shown in FIG. 11B, the first antenna 1 and the first antenna 2 separately perform the backoff on the first carrier, the first antenna 1 needs to complete four idle backoff slots (idle ECCA slot) to complete the backoff, and the first antenna 2 needs to complete six idle backoff slots (idle ECCA slot) to complete the backoff. Backoff processes of the first antenna 1 and the first antenna 2 are independent of each other, and before performing the SSB transmission, the first antenna 1 needs to perform channel sensing for an interval of 25 µs prior to downlink transmission (performing channel sensing for an interval of 25 µs prior to downlink transmission), to determine whether the first carrier is idle. When it is determined that the first carrier is idle, the first antenna 1 may perform the SSB transmission on the first carrier. After the first antenna 2 implements six idle backoff slots, the first antenna 2 needs to perform channel sensing for an interval of 25 µs prior to downlink transmission (performing channel sensing for an interval of 25 us prior to downlink transmission) before performing the SSB transmission, to determine whether the first carrier is idle. When it is determined that the first carrier is idle, the first antenna 2 may perform the SSB transmission on the first carrier. In this case, the network device may determine time at which the first antenna 1 completes the LBT, calculate a difference between the time and the configured transmission time of the first SS Burst Set, and determine a value greater than or equal to the time difference as the first time offset. Alternatively, the network device may determine time at which the first antenna 2 completes the LBT, calculate a difference between the time and the configured transmission time of the first SS Burst Set, and determine a value greater than or equal to the time difference as the first time offset. Alternatively, the network device may separately determine the time at which the first antenna 1 completes the LBT and the time at which the first antenna 2 completes the LBT, select a larger one from the two pieces of time, calculate a difference between the larger time and the configured transmission time of the first SS Burst Set, and determine a value greater than or equal to the time difference as the first time offset.

Step S902 is described as follows: That the network device sends the first time offset to a terminal includes: sending, by the network device, DCI to the terminal, where the first time offset may be carried in the DCI, and the DCI may be UE-specific DCI or group-common DCI. How the network device sends the first time offset is not limited in this application.

Step S903 is described as follows: The terminal receives the first time offset coming from the network device, and performs the rate matching based on the first time offset. The "rate matching" means that bits on a transmission channel are repeated or punctured to match a bearer capability of a physical channel, and reach a bit rate required by a transport format during channel mapping. In this application, the network device may send the DCI to the terminal, where the DCI is used to indicate a configured transmission time of downlink data and the configured transmission time of the first SS Burst Set. The terminal may determine an actual transmission time of the downlink data based on the obtained first time offset, the configured transmission time of the downlink data, and the configured transmission time of the first SS Burst Set, to decode the downlink data. The downlink data may be PDSCH data, a CSI-RS, or an RS. The "configured transmission time of the downlink data" is a transmission time configured by the network device for the downlink data.

Specifically, a prerequisite of the foregoing rate matching process is that the network device and the terminal know a sending manner of the first SS Burst Set. When the network device and the terminal do not know the sending manner of the first SS Burst Set, the network device further needs to send indication information of the sending manner to the terminal. The indication information of the sending manner is used to indicate the sending manner of the first SS Burst Set.

In conclusion, this application provides a communication method, including: performing, by the plurality of first antennas of the network device, the LBT on the first carrier, and determining, by the network device, the first time offset when at least one first antenna completes the LBT; sending, by the network device, the first time offset to the terminal; and performing, by terminal, the rate matching on the first carrier based on the first time offset, where the first time offset is a time offset of the actual transmission time of the first SS Burst Set on the first carrier relative to the configured transmission time of the first SS Burst Set. According to the method, the terminal may determine the actual transmission time of the first SS Burst Set based on the first time offset, to perform the rate matching and accurately parse the downlink data, thereby improving reliability of the communications system.

Embodiment 4

Figure 12A:
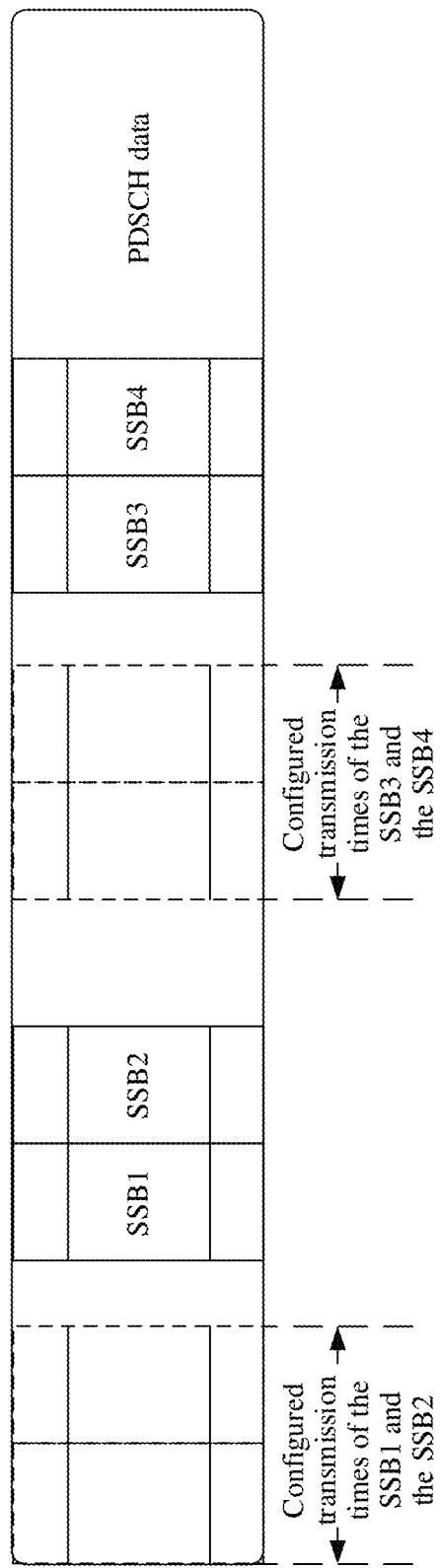
FIG. 12A to FIG. 12C are schematic diagrams of manners of sending SSBs and PDSCH data according to an embodiment of this application.
Figure 12B:
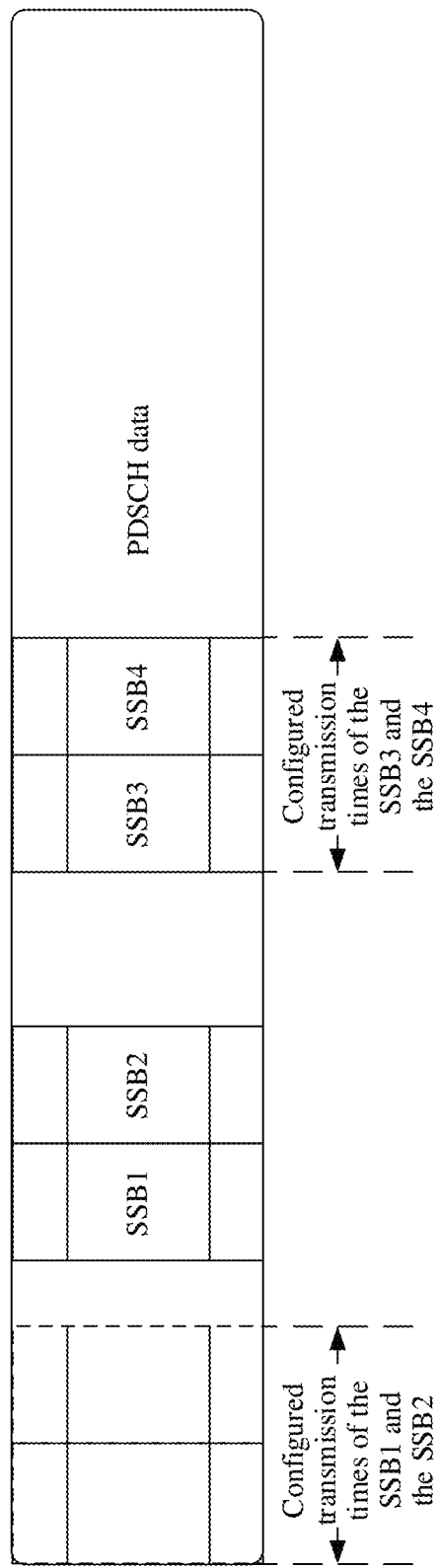
Figure 12C:
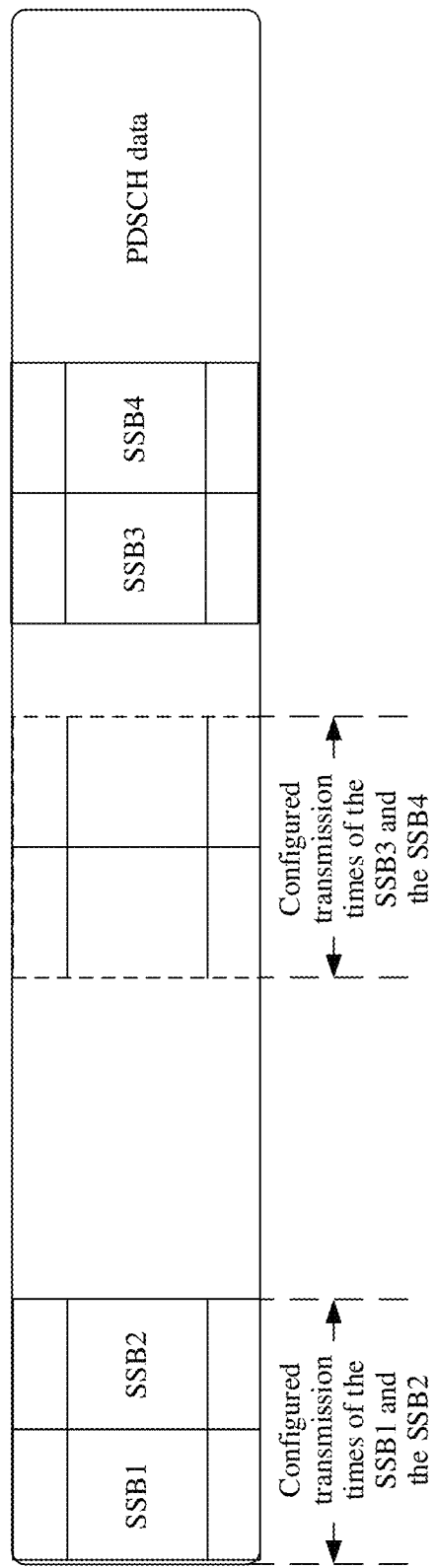

Based on Embodiment 3, further, the communication method further includes: when LBT statuses of the plurality of first antennas are inconsistent, sending, by a network device, some SSBs of a first SS Burst Set, where the LBT statuses are that LBT is completed or the LBT is not completed; and further, if an SSB corresponding to a second antenna is not successfully sent, sending, by the network device, downlink data to a terminal by using a time-frequency resource of the SSB corresponding to the second antenna, where the second antenna is any one of the first antennas. Specifically, an example in which the downlink data is PDSCH data is used. FIG. 12A to FIG. 12C are schematic diagrams of manners of sending SSBs and PDSCH data according to an embodiment of this application. As shown in FIG. 12A, a first antenna 1 is configured to send an SSB1 and an SSB2, and a first antenna 2 is configured to send an SSB3 and an SSB4. Because at a configured transmission time of the SSB2 and before the configured transmission time of the SSB2, the first antenna 1 does not complete the LBT, the first antenna 1 delays sending the SSB1 and the SSB2. Similarly, because at a configured transmission time of the SSB4 and before the configured transmission time of the SSB4, the first antenna 2 does not complete the LBT, the first antenna 2 delays sending the SSB3 and the SSB4, and the network device may send the PDSCH data by using time-frequency resources configured by the network device for the SSB1, the SSB2, the SSB3, and the SSB4, in other words, the network device punctures on the time-frequency resources configured for the SSB1, the SSB2, the SSB3, and the SSB4, and sends the PDSCH data by using the time-frequency resources.

As shown in FIG. 12B, because at the configured transmission time of the SSB2 and before the configured transmission time of the SSB2, the first antenna 1 does not complete the LBT, the first antenna 1 delays sending the SSB1 and the SSB2. Because at the configured transmission time of the SSB4 and before the configured transmission time of the SSB4, the first antenna 2 completes the LBT, the first antenna 2 normally sends the SSB3 and the SSB4 at a configured transmission time of the SSB3 and the configured transmission time of the SSB4, and the network device may send the PDSCH data by using time-frequency resources configured by the network device for the SSB1 and the SSB2, in other words, the network device punctures on the time-frequency resources configured for the SSB1 and the SSB2, and sends the PDSCH data by using the time-frequency resources.

As shown in FIG. 12C, because at the configured transmission time of the SSB2 and before the configured transmission time of the SSB2, the first antenna 1 completes the LBT, the first antenna 1 normally sends the SSB1 and the SSB2 at a configured transmission time of the SSB1 and the configured transmission time of the SSB2. However, because at the configured transmission time of the SSB4 and before the configured transmission time of the SSB4, the first antenna 2 does not complete the LBT, the first antenna 2 delays sending the SSB3 and the SSB4. The network device may send the PDSCH data by using time-frequency resources configured by the network device for the SSB3 and the SSB4, in other words, the network device punctures on the time-frequency resources configured for the SSB3 and the SSB4, and sends the PDSCH data by using the time-frequency resources.

Figure 13:
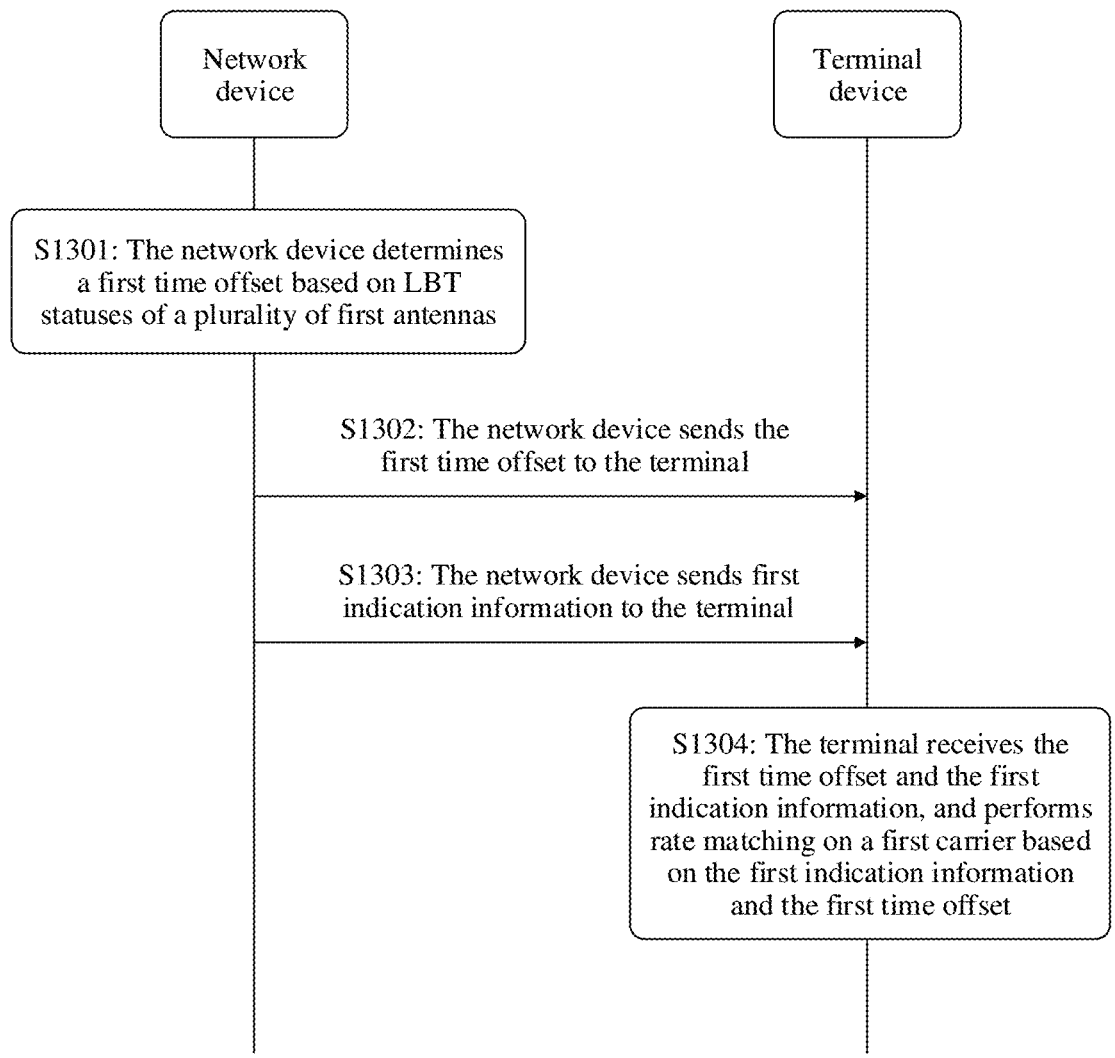
FIG. 13 is an interactive flowchart of a communication method according to another embodiment of this application.

Based on this case, which SSBs are sent and which SSBs are not sent are critical to a rate matching process. Based on this case, in this application, FIG. 13 is an interactive flowchart of a communication method according to another embodiment of this application. As shown in FIG. 13, the communication method includes the following steps.

Step S1301: The network device determines a first time offset based on the LBT statuses of the plurality of first antennas.

Step S1302: The network device sends the first time offset to a terminal.

Step S1301 is similar to step S901, step S1302 is similar to step S902, and for specific content, refer to step S901 and step S902. Details are not described in this application again.

Step S1303: The network device sends first indication information to the terminal.

Step S1303 may alternatively be performed before step S1302, or may be performed in parallel with step S1302. A sequence between step S1302 and step S1303 is not limited in this application.

Step S1304: The terminal receives the first time offset and the first indication information, and performs rate matching on a first carrier based on the first indication information and the first time offset.

The first indication information is used to indicate whether the plurality of first antennas separately complete the LBT when sending SSBs of the first SS Burst Set. Based on this case, the terminal may determine, based on the first indication information, which SSB in the first SS Burst Set is successfully sent and which SSB is not successfully sent, and perform the rate matching. For example, a length of the first indication information is 2 bits. For example, the first bit indicates whether the first antenna 1 completes the LBT when sending the SSB1 and the SSB2, and the second bit indicates whether the first antenna 2 completes the LBT when sending the SSB3 and the SSB4. It can be learned that the network device may determine, based on the first indication information, which SSBs are successfully sent and which SSBs are not successfully sent.

Alternatively, the first indication information is used to indicate whether the SSBs of the first SS Burst Set are successfully sent. For example, the first indication information includes two bits, the first bit indicates whether the SSB1 and the SSB2 are successfully sent, and the second bit indicates whether the SSB3 and the SSB4 are successfully sent.

Further, the first indication information may be carried in DCI, and the DCI may be UE-specific DCI or group-common DCI. How the network device sends the first indication information is not limited in this application.

The length of the first indication information is Y bits, each of the Y bits is used to indicate LBT statuses of $$\left\lceil \frac{Z}{Y} \right\rceil$$

first antennas, where Z represents a quantity of the plurality of first antennas.

Step S1304 is described as follows: As described above, if the SSB corresponding to the second antenna is not successfully sent, the network device sends the downlink data to the terminal by using the time-frequency resource of the SSB corresponding to the second antenna. Therefore, when performing the rate matching, the terminal may determine, based on the first indication information, that a time-frequency resource of which SSB is used to send the downlink data.

In this embodiment of this application, the first indication information is used to indicate whether the plurality of first antennas separately complete the LBT when sending the SSBs of the first SS Burst Set, or indicate whether the SSBs of the first SS Burst Set are successfully sent. The terminal may be enabled to determine, based on the first indication information, which SSBs are successfully sent and which SSBs are not successfully sent, to accurately implement the rate matching, thereby improving reliability of a communications system.

Embodiment 5

Figure 14:
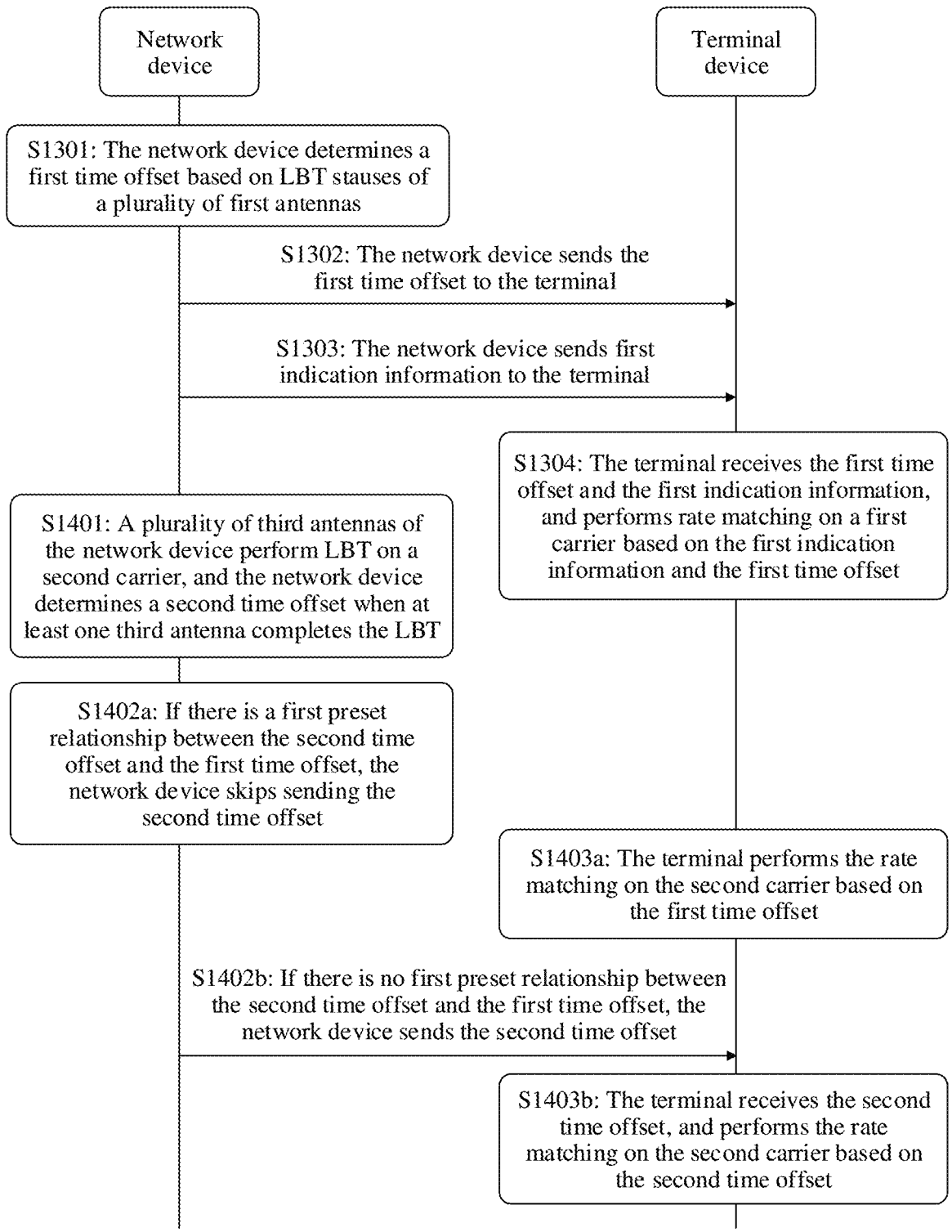
FIG. 14 is an interactive flowchart of a communication method according to an embodiment of this application.

In Embodiment 3 and Embodiment 4, a single carrier is used as an example. Actually, this application further has a multi-carrier application scenario. For example, a first carrier is a primary channel, and a corresponding first SS Burst Set is used for random access, channel measurement feedback, and the like; a second carrier is a secondary channel, and a corresponding second SS Burst Set is used for the channel measurement feedback. The following describes a multi-carrier-based communication method. Specifically, based on Embodiment 1 or Embodiment 2, FIG. 14 is an interactive flowchart of a communication method according to an embodiment of this application. As shown in FIG. 14, the method includes the following steps.

Step S1401: A plurality of third antennas of a network device performs LBT on a second carrier, and the network device determines a second time offset when at least one third antenna completes the LBT.

Step S1402a: If there is a first preset relationship between the second time offset and a first time offset, the network device skips sending the second time offset.

Step S1403a: The terminal performs rate matching on the second carrier based on the first time offset.

Step S1402b: If there is no first preset relationship between the second time offset and the first time offset, the network device sends the second time offset.

Step S1403b: The terminal receives the second time offset, and performs the rate matching on the second carrier based on the second time offset.

A solution including step S1402a and step S1403a and a solution including step S1402b and step S1403b are parallel solutions. It should be noted that the solution including step S1402a and step S1403a and the solution including step S1402b and step S1403b are optional.

Step S1402a to step S1403b may be performed after step S1302. However, a sequence of step S1401 and step S1302 is not limited in this embodiment. In FIG. 14, an example in which step S1401 is performed after step S1304 is used.

Step S1401 is described as follows: The plurality of third antennas are configured to send SSBs of the second SS Burst Set, and the second time offset is a time offset of an actual transmission time of the second SS Burst Set on the second carrier relative to a configured transmission time of the second SS Burst Set. It should be noted that step S1401 is similar to step S501, and for details, refer to step S501. Details are not described in this application again.

Descriptions are made with reference to step S1402a and step S1403a. For example, the first preset relationship is that the second time offset is the same as the first time offset, or there is a fixed time interval between the first time offset and the second time offset. In this case, the network device does not need to send the second time offset. When the second time offset is the same as the first time offset, the terminal only needs to determine the actual transmission time of the second SS Burst Set based on the first time offset, to accurately perform the rate matching on the second carrier. When there is a fixed time interval between the second time offset and the first time offset, the terminal only needs to determine the actual transmission time of the second SS Burst Set based on the first time offset and the fixed time interval, to accurately perform the rate matching on the second carrier. For the rate matching process performed by the terminal device on the second carrier, refer to step S503. Details are not described in this application again.

Descriptions are made with reference to step S1402b and step S1403b. It should be noted that if there is no first preset relationship between the second time offset and the first time offset, the network device sends the second time offset to the terminal. The terminal may determine the actual transmission time of the second SS Burst Set based on the second time offset, to accurately perform the rate matching. For the rate matching process performed by the terminal device on the second carrier, refer to step S503. Details are not described in this application again.

In conclusion, in this embodiment, if there is a first preset relationship between the second time offset and the first time offset, the network device skips sending the second time offset to the terminal, so that the terminal implements the rate matching, thereby reducing system signaling overheads.

Embodiment 6

Based on Embodiment 4 or Embodiment 5, if SSBs of a second SS Burst Set are sent by a plurality of third antennas, there is a second preset relationship between LBT statuses that the plurality of third antennas have when the plurality of third antennas send SSBs of a first SS Burst Set and LBT statuses that a plurality of first antennas have when the plurality of first antennas send the SSBs of the first SS Burst Set, and the LBT statuses are that the LBT is completed or LBT is not completed, first indication information is further used to indicate whether the plurality of third antennas separately complete the LBT when sending the SSBs of the second SS Burst Set, or the first indication information is further used to indicate whether the SSBs of the second SS Burst Set are successfully sent.

The second preset relationship is that the LBT statuses that the plurality of third antennas have when the plurality of third antennas send the SSBs of the first SS Burst Set are the same as the LBT statuses that the plurality of first antennas have when the plurality of first antennas send the SSBs of the first SS Burst Set, or there is a fixed correspondence between the LBT statuses that the plurality of third antennas have when the plurality of third antennas send the SSBs of the first SS Burst Set and the LBT statuses that the plurality of first antennas have when the plurality of first antennas send the SSBs of the first SS Burst Set.

If the SSBs of the second SS Burst Set are sent by the plurality of third antennas, and there is no second preset relationship between the LBT statuses that the plurality of third antennas have when the plurality of third antennas send the SSBs of the first SS Burst Set and the LBT statuses that the plurality of first antennas have when the plurality of first antennas send the SSBs of the first SS Burst Set, a network device sends second indication information to a terminal, where the second indication information is used to indicate whether the plurality of third antennas separately complete the LBT when sending the SSBs of the second SS Burst Set, or the second indication information is used to indicate whether the SSBs of the second SS Burst Set are successfully sent.

The first indication information and the second indication information may be respectively sent on a first carrier and a second carrier, or both the first indication information and the second indication information are sent on the first carrier, or both the first indication information and the second indication information are sent on the second carrier. This is not limited in this application.

Figure 15A:
FIG. 15A to FIG. 15D are schematic diagrams of manners of sending an SS Burst Set according to an embodiment of this application.

The communication method is described with reference to Embodiment 4 and Embodiment 5. FIG. 15A to FIG. 15D are schematic diagrams of manners of sending an SS Burst Set according to an embodiment of this application. As shown in FIG. 15A, the first SS Burst Set and the second SS Burst Set that are sent by the network device on the first carrier and the second carrier are the same, and both include an SSB1, an SSB2, an SSB3, and an SSB4. When the network device sends the first SS Burst Set and the second SS Burst Set, the network device may send the first time offset and/or the second time offset, where the first time offset is the same as the second time offset. Optionally, the network device may further send the first indication information and/or the second indication information, where the first indication information is the same as the second indication information.

Figure 15B:
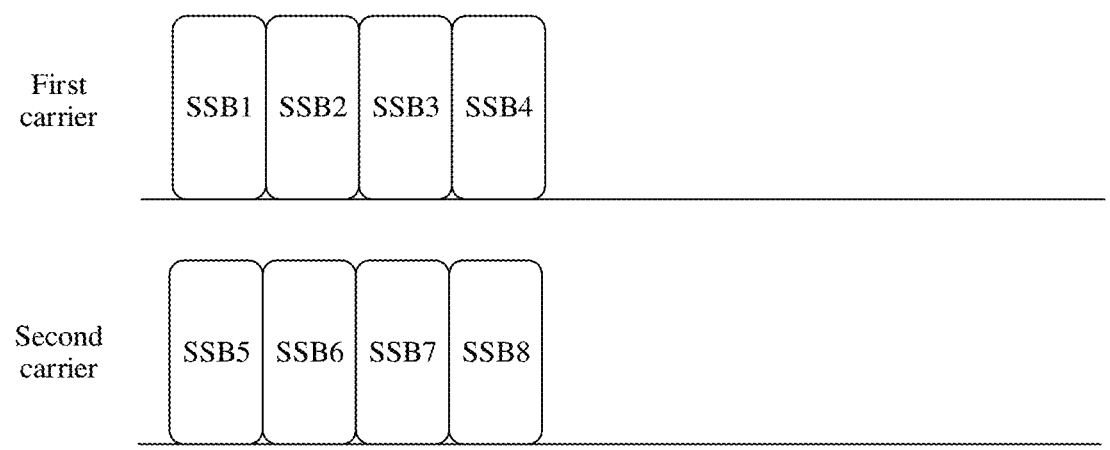

As shown in FIG. 15B, the first SS Burst Set and the second SS Burst Set that are sent by the network device on the first carrier and the second carrier are different. When the network device sends the first SS Burst Set and the second SS Burst Set, the network device may send the first time offset and/or the second time offset, where the first time offset is the same as the second time offset. Optionally, the network device may send the first indication information and/or the second indication information. When there is a second preset relationship between an LBT state of an antenna configured to send the first SS Burst Set and an LBT state of an antenna configured to send the second SS Burst Set, the network device may send only the first indication information or the second indication information.

Figure 15C:
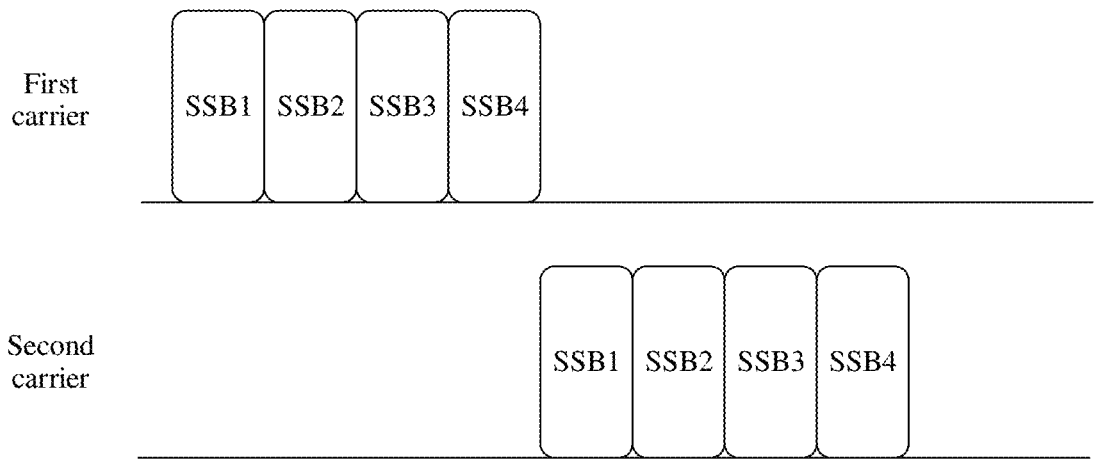

As shown in FIG. 15C, the first SS Burst Set and the second SS Burst Set that are sent by the network device on the first carrier and the second carrier are the same, and both include the SSB1, the SSB2, the SSB3, and the SSB4. However, there is a time interval between sending start time of the first SS Burst Set and sending start time of the second SS Burst Set. Therefore, when the network device sends the first SS Burst Set and the second SS Burst Set, the network device may send the first time offset and/or the second time offset. When there is a first preset relationship between the first time offset and the second time offset, the network device may send only the first time offset or the second time offset. Similarly, the network device may send the first indication information and/or the second indication information, where the first indication information is the same as the second indication information.

Figure 15D:
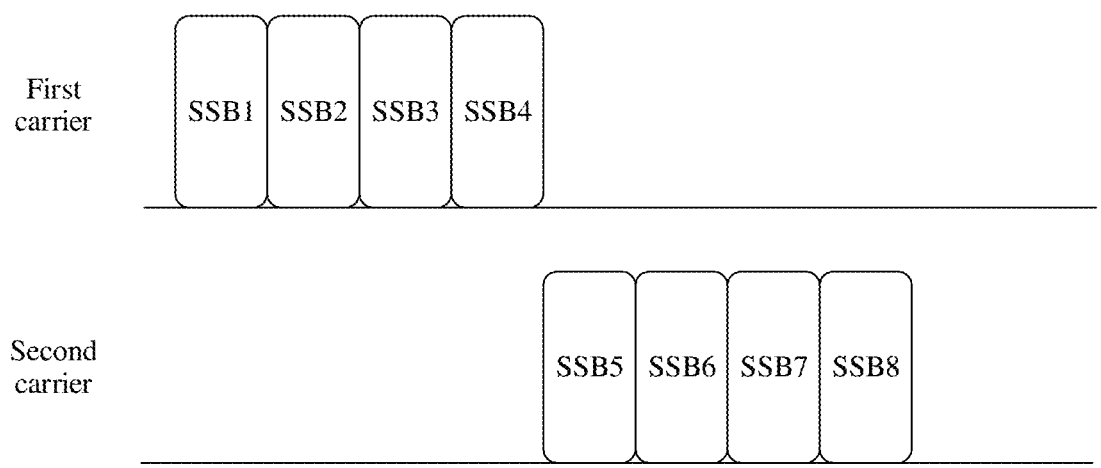

As shown in FIG. 15D, the first SS Burst Set and the second SS Burst Set that are sent by the network device on the first carrier and the second carrier are different, and there is a time interval between a transmission time of the first SS Burst Set and a transmission time of the second SS Burst Set. Therefore, when the network device sends the first SS Burst Set and the second SS Burst Set, the network device may send the first time offset and/or the second time offset. When there is a first preset relationship between the first time offset and the second time offset, the network device may send only the first time offset or the second time offset. Similarly, the network device may send the first indication information and/or the second indication information. When there is a second preset relationship between an LBT state of an antenna configured to send the first SS Burst Set and an LBT state of an antenna configured to send the second SS Burst Set, the network device may send only the first indication information or the second indication information.

In this embodiment of this application, if the SSBs of the second SS Burst Set are sent by the plurality of third antennas, and there is a second preset relationship between the LBT statuses that the plurality of third antennas have when the plurality of third antennas send the SSBs of the first SS Burst Set and the LBT statuses that the plurality of first antennas have when the plurality of first antennas send the SSBs of the first SS Burst Set, the first indication information is further used to indicate the LBT statuses that the plurality of third antennas have when the plurality of third antennas send the SSBs of the second SS Burst Set, or the first indication information is further used to indicate whether the SSBs of the second SS Burst Set are successfully sent, in other words, the network device does not need to send the second indication information, thereby reducing system signaling overheads.

Embodiment 7

Figure 16:
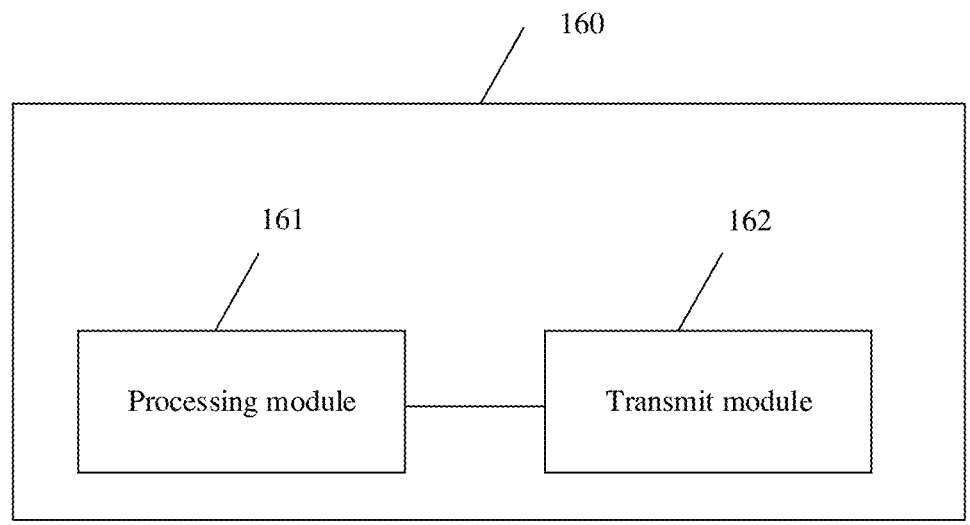
FIG. 16 is a schematic structural diagram of a communications apparatus 160 according to an embodiment of this application.

FIG. 16 is a schematic structural diagram of a communications apparatus 160 according to an embodiment of this application. As shown in FIG. 16, the apparatus 160 includes: a processing module 161, configured to perform LBT on a first carrier, and determine a first time offset when the LBT is completed, where the first carrier is used to send a first SS Burst Set, and the first time offset is a time offset of an actual transmission time of the first SS Burst Set on the first carrier relative to a configured transmission time of the first SS Burst Set; and a transmit module 162, configured to send the first time offset to a terminal.

Optionally, the processing module 161 is further configured to: perform the LBT on a second carrier, and determine a second time offset when the LBT is completed, where the second carrier is used to send a second SS Burst Set, and the second time offset is a time offset of an actual transmission time of the second SS Burst Set on the second carrier relative to a configured transmission time of the second SS Burst Set.

The transmit module 162 is further configured to: if there is a first preset relationship between the second time offset and the first time offset, skip sending the second time offset; or if there is no first preset relationship between the second time offset and the first time offset, send the second time offset.

Optionally, the first preset relationship is that the second time offset is the same as the first time offset, or there is a fixed time interval between the first time offset and the second time offset.

Optionally, a length of the first time offset is X bits, and a maximum value of the first time offset is a time length of $$\left\lceil \frac{M}{N} \times 2^{K-X} \right\rceil$$

SSBs, where M represents a maximum time offset of the first SS Burst Set, N represents a time length of the first SS Burst Set, and $2^K$ represents a maximum quantity of SSBs that can be transmitted in one SS Burst Set window by a communications system to which the network device and the terminal belong.

The communications apparatus provided in this application may perform the method related to the network device in Embodiment 1 or Embodiment 2. A principle and an effect of the communications apparatus are not described herein again in this application.

Embodiment 8

Figure 17:
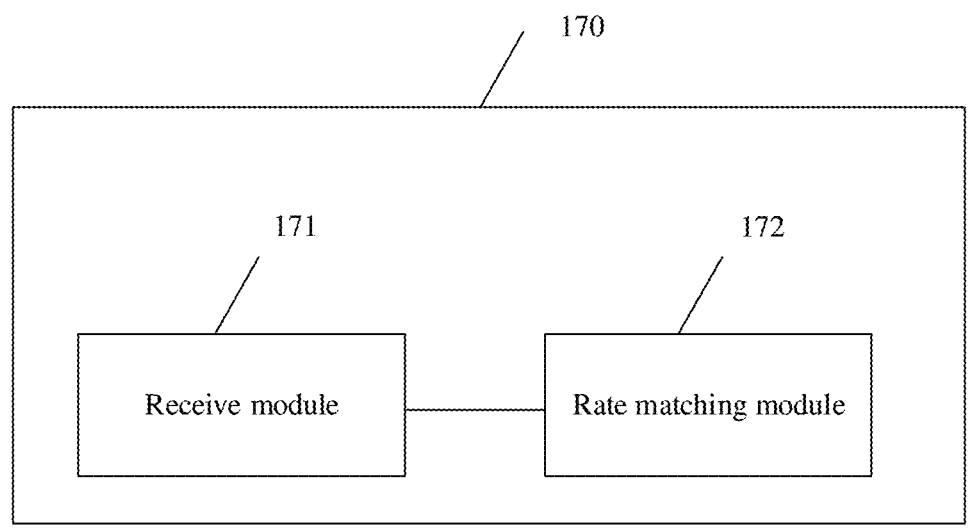
FIG. 17 is a schematic structural diagram of a communications apparatus 170 according to an embodiment of this application.

FIG. 17 is a schematic structural diagram of a communications apparatus 170 according to an embodiment of this application. As shown in FIG. 17, the apparatus 170 includes: a receive module 171, configured to receive a first time offset sent by a network device, where the first time offset is a time offset of an actual transmission time of a first synchronization signal burst set SS Burst Set on a first carrier relative to a configured transmission time of the first SS Burst Set; and a rate matching module 172, configured to perform rate matching on the first carrier based on the first time offset.

Optionally, the rate matching module 172 is further configured to: when the receive module 171 does not receive a second time offset, perform the rate matching on a second carrier based on the first time offset, where the second time offset is a time offset of an actual transmission time of a second SS Burst Set on the second carrier relative to a configured transmission time of the second SS Burst Set; or when the receive module 171 receives the second time offset, perform the rate matching on the second carrier based on the second time offset.

Optionally, a length of the first time offset is X bits, and a maximum value of the first time offset is a time length of $$\left\lceil \frac{M}{N} \times 2^{K-X} \right\rceil$$

SSBs, where M represents a maximum time offset of the first SS Burst Set, N represents a time length of the first SS Burst Set, and $2^K$ represents a maximum quantity of SSBs that can be transmitted in one SS Burst Set window by a communications system to which the network device and the terminal belong.

The communications apparatus provided in this application may perform the method related to the terminal in Embodiment 1 or Embodiment 2. A principle and an effect of the communications apparatus are not described herein again in this application.

Embodiment 9

Figure 18:
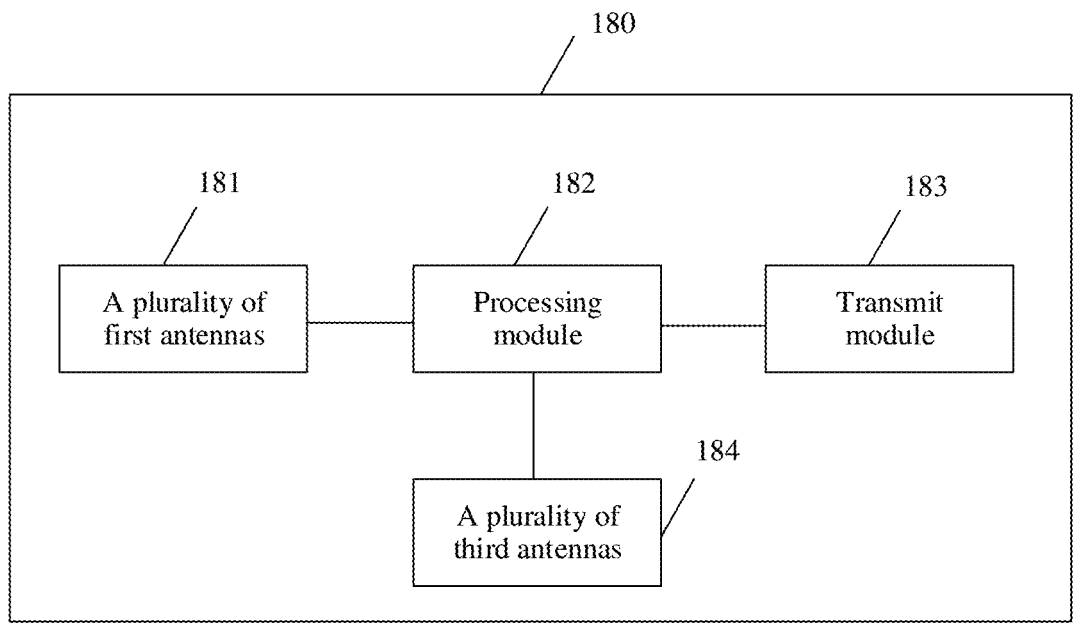
FIG. 18 is a schematic structural diagram of a communications apparatus 180 according to an embodiment of this application.

FIG. 18 is a schematic structural diagram of a communications apparatus 180 according to an embodiment of this application. As shown in FIG. 18, the apparatus 180 includes: a plurality of first antennas 181, configured to send, on a first carrier, synchronization signal blocks SSBs of a first synchronization signal burst set SS Burst Set; a processing module 182, configured to: determine a first time offset when at least one first antenna completes LBT, where the first time offset is a time offset of an actual transmission time of the first SS Burst Set on the first carrier relative to a configured transmission time of the first SS Burst Set; and a transmit module 183, configured to send the first time offset to a terminal.

Optionally, the transmit module 183 is further configured to send first indication information to the terminal, where the first indication information is used to indicate whether the plurality of first antennas separately complete the LBT when sending the SSBs of the first SS Burst Set, or the first indication information is used to indicate whether the SSBs of the first SS Burst Set are successfully sent.

Optionally, the transmit module 183 is further configured to: if an SSB corresponding to a second antenna is not successfully sent, send downlink data to the terminal by using a time-frequency resource of the SSB corresponding to the second antenna, where the second antenna is any one of the first antennas.

Optionally, the apparatus further includes a plurality of third antennas 184.

The plurality of third antennas 184 are configured to send SSBs of a second SS Burst Set.

The processing module 182 is further configured to determine a second time offset when at least one third antenna completes the LBT, where the second time offset is a time offset of an actual transmission time of the second SS Burst Set on the second carrier relative to a configured transmission time of the second SS Burst Set.

The transmit module 183 is further configured to: if there is a first preset relationship between the second time offset and the first time offset, skip sending the second time offset; or if there is no first preset relationship between the second time offset and the first time offset, send the second time offset.

Optionally, the first preset relationship is that the second time offset is the same as the first time offset, or there is a fixed time interval between the first time offset and the second time offset.

Optionally, if there is a second preset relationship between LBT statuses that the plurality of third antennas have when the plurality of third antennas send the SSBs of the second SS Burst Set and LBT statuses that the plurality of first antennas have when the plurality of first antennas send the SSBs of the first SS Burst Set, and the LBT statuses are that the LBT is completed or the LBT is not completed, the first indication information is further used to indicate whether the plurality of third antennas separately complete the LBT when sending the SSBs of the second SS Burst Set, or the first indication information is further used to indicate whether the SSBs of the second SS Burst Set are successfully sent; or if there is no second preset relationship between the LBT statuses that the plurality of third antennas have when the plurality of third antennas send the SSBs of the first SS Burst Set and the LBT statuses that the plurality of first antennas have when the plurality of first antennas send the SSBs of the first SS Burst Set, the transmit module 183 is further configured to send second indication information to the terminal, where the second indication information is used to indicate whether the plurality of third antennas separately complete the LBT when sending the SSBs of the second SS Burst Set, or the second indication information is used to indicate whether the SSBs of the second SS Burst Set are successfully sent.

Optionally, the second preset relationship is that the LBT statuses that the plurality of third antennas have when the plurality of third antennas send the SSBs of the first SS Burst Set are the same as the LBT statuses that the plurality of first antennas have when the plurality of first antennas send the SSBs of the first SS Burst Set, or there is a fixed correspondence between the LBT statuses that the plurality of third antennas have when the plurality of third antennas send the SSBs of the first SS Burst Set and the LBT statuses that the plurality of first antennas have when the plurality of first antennas send the SSBs of the first SS Burst Set.

Optionally, a length of the first time offset is X bits, and a maximum value of the first time offset is a time length of $$\left\lceil \frac{M}{N} \times 2^{K-X} \right\rceil$$

SSBs, where M represents a maximum time offset of the first SS Burst Set, N represents a time length of the first SS Burst Set, and $2^K$ represents a maximum quantity of SSBs that can be transmitted in one SS Burst Set window by a communications system to which the network device and the terminal belong.

Optionally, the length of the first indication information is Y bits, each of the Y bits is used to represent LBT statuses of $$\left\lceil \frac{Z}{Y} \right\rceil$$

first antennas, where Z represents a quantity of the plurality of first antennas.

The communications apparatus provided in this application may perform the method related to the network device in Embodiment 3, Embodiment 4, Embodiment 5, or Embodiment 6. A principle and an effect of the communications apparatus are not described herein again in this application.

Embodiment 10

Figure 19:
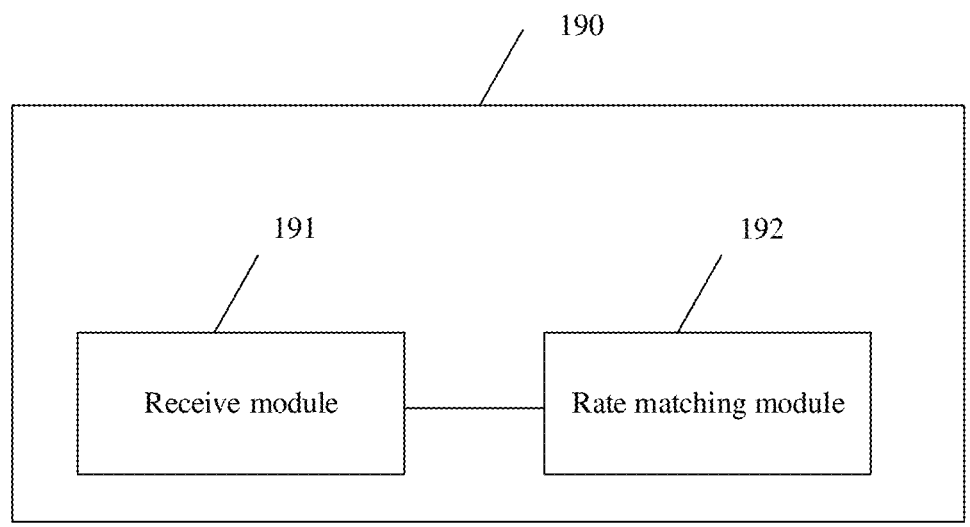
FIG. 19 is a schematic structural diagram of a communications apparatus 190 according to an embodiment of this application.

FIG. 19 is a schematic structural diagram of a communications apparatus 190 according to an embodiment of this application. As shown in FIG. 19, the apparatus 190 includes: a receive module 191, configured to receive a first time offset sent by a network device, where the first time offset is a time offset of an actual transmission time of a first synchronization signal burst set SS Burst Set on a first carrier relative to a configured transmission time of the first SS Burst Set; and a rate matching module 192, configured to perform rate matching on the first carrier based on the first time offset.

Optionally, the receive module 191 is further configured to receive first indication information sent by the network device, where the first indication information is used to indicate whether a plurality of first antennas separately complete the LBT when sending SSBs of the first SS Burst Set, or the first indication information is used to indicate whether SSBs of the first SS Burst Set are successfully sent.

Optionally, the receive module 191 is further configured to: if the first indication information indicates that a second antenna does not complete LBT when sending the SSBs of the first SS Burst Set, or the first indication information indicates that an SSB corresponding to the second antenna is not successfully sent, receive downlink data by using a time-frequency resource of the SSB corresponding to the second antenna, where the second antenna is any one of the first antennas.

Optionally, the rate matching module 192 is further configured to: when the receive module 191 does not receive a second time offset, perform the rate matching on a second carrier based on the first time offset, where the second time offset is a time offset of an actual transmission time of a second SS Burst Set on the second carrier relative to a configured transmission time of the second SS Burst Set; or when the receive module 191 receives the second time offset, perform the rate matching on the second carrier based on the second time offset.

Optionally, the first indication information is further used to indicate whether a plurality of third antennas complete the LBT when sending SSBs of the second SS Burst Set, or the first indication information is further used to indicate whether SSBs of the second SS Burst Set are successfully sent; or the receive module 191 is further configured to receive second indication information sent by the network device, where the second indication information is used to indicate whether a plurality of third antennas separately complete the LBT when sending SSBs of the second SS Burst Set, or the second indication information is used to indicate whether the SSBs of the second SS Burst Set are successfully sent.

Optionally, a length of the first time offset is X bits, and a maximum value of the first time offset is a time length of $$\left\lceil \frac{M}{N} \times 2^{K-X} \right\rceil$$

SSBs, where M represents a maximum time offset of the first SS Burst Set, N represents a time length of the first SS Burst Set, and $2^K$ represents a maximum quantity of SSBs that can be transmitted in one SS Burst Set window by a communications system to which the network device and the terminal belong.

Optionally, the length of the first indication information is Y bits, each of the Y bits is used to represent LBT statuses of $$\left\lceil \frac{Z}{Y} \right\rceil$$

first antennas, where Z represents a quantity of the plurality of first antennas.

The communications apparatus provided in this application may perform the method related to the terminal in Embodiment 3, Embodiment 4, Embodiment 5, or Embodiment 6. A principle and an effect of the communications apparatus are not described herein again in this application.

Embodiment 11

Figure 20:
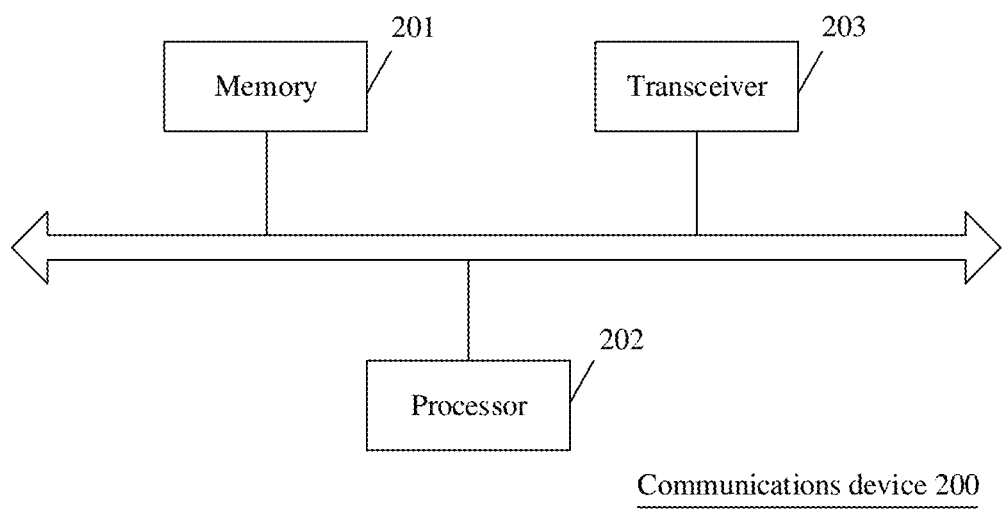
FIG. 20 is a schematic structural diagram of a communications device 200 according to an embodiment of this application.

FIG. 20 is a schematic structural diagram of a communications device 200 according to an embodiment of this application. As shown in FIG. 20, the device 200 includes: a memory 201, a processor 202, and a transceiver 203. The memory 201 is configured to store an instruction, the processor 202 is configured to execute the instruction, to implement the following corresponding functions, and the processor 202 is configured to control the transceiver 203 to implement the following corresponding functions.

The processor 201 is configured to perform LBT on a first carrier, and determine a first time offset when the LBT is completed, where the first carrier is used to send a first SS Burst Set, and the first time offset is a time offset of an actual transmission time of the first SS Burst Set on the first carrier relative to a configured transmission time of the first SS Burst Set.

The transceiver 203 is configured to send the first time offset to a terminal.

Optionally, the processor 201 is further configured to: perform the LBT on a second carrier, and determine a second time offset when the LBT is completed, where the second carrier is used to send a second SS Burst Set, and the second time offset is a time offset of an actual transmission time of the second SS Burst Set on the second carrier relative to a configured transmission time of the second SS Burst Set.

The transceiver 203 is further configured to: if there is a first preset relationship between the second time offset and the first time offset, skip sending the second time offset; or if there is no first preset relationship between the second time offset and the first time offset, send the second time offset.

Optionally, the first preset relationship is that the second time offset is the same as the first time offset, or there is a fixed time interval between the first time offset and the second time offset.

Optionally, a length of the first time offset is X bits, and a maximum value of the first time offset is a time length of $$\left\lceil \frac{M}{N} \times 2^{K-X} \right\rceil$$

SSBs, where M represents a maximum time offset of the first SS Burst Set, N represents a time length of the first SS Burst Set, and $2^K$ represents a maximum quantity of SSBs that can be transmitted in one SS Burst Set window by a communications system to which the network device and the terminal belong.

The communications device provided in this application may perform the method related to the network device in Embodiment 1 or Embodiment 2. A principle and an effect of the communications device are not described herein again in this application.

Embodiment 12

Figure 21:
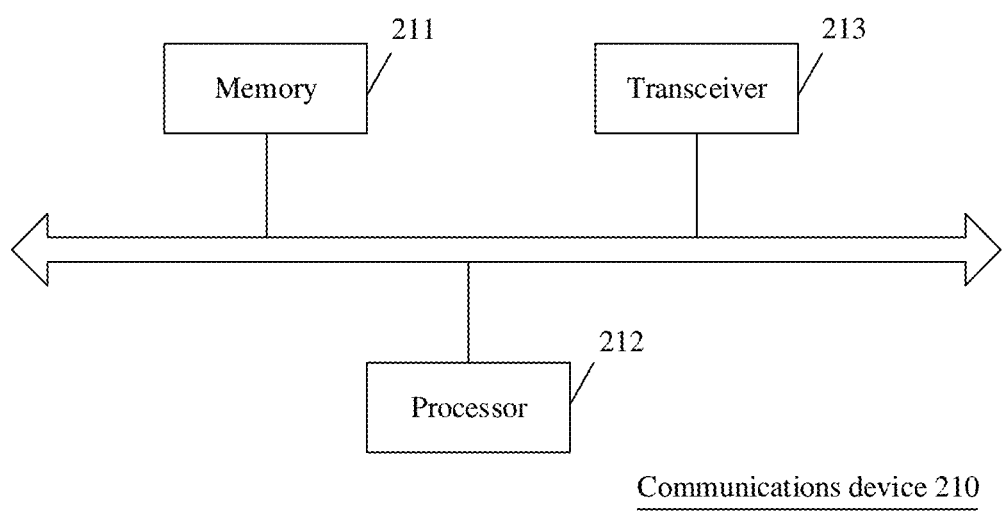
FIG. 21 is a schematic structural diagram of a communications device 210 according to an embodiment of this application.

FIG. 21 is a schematic structural diagram of a communications device 210 according to an embodiment of this application. As shown in FIG. 21, the device 210 includes: a memory 211, a processor 212, and a transceiver 213. The memory 211 is configured to store an instruction, the processor 212 is configured to execute the instruction, to implement the following corresponding functions, and the processor 212 is configured to control the transceiver 213 to implement the following corresponding functions.

The transceiver 213 is configured to receive a first time offset sent by a network device, where the first time offset is a time offset of an actual transmission time of a first synchronization signal burst set SS Burst Set on a first carrier relative to a configured transmission time of the first SS Burst Set.

The processor 212 is configured to perform rate matching on the first carrier based on the first time offset.

Optionally, the processor 212 is further configured to: when the transceiver 213 does not receive a second time offset, perform the rate matching on a second carrier based on the first time offset, where the second time offset is a time offset of an actual transmission time of a second SS Burst Set on the second carrier relative to a configured transmission time of the second SS Burst Set; or when the transceiver 213 receives the second time offset, perform the rate matching on the second carrier based on the second time offset.

Optionally, a length of the first time offset is X bits, and a maximum value of the first time offset is a time length of $$\left\lceil \frac{M}{N} \times 2^{K-X} \right\rceil$$

SSBs, where M represents a maximum time offset of the first SS Burst Set, N represents a time length of the first SS Burst Set, and $2^K$ represents a maximum quantity of SSBs that can be transmitted in one SS Burst Set window by a communications system to which the network device and the terminal belong.

The communications device provided in this application may perform the method related to the terminal in Embodiment 1 or Embodiment 2. A principle and an effect of the communications device are not described herein again in this application.

Embodiment 13

Figure 22:
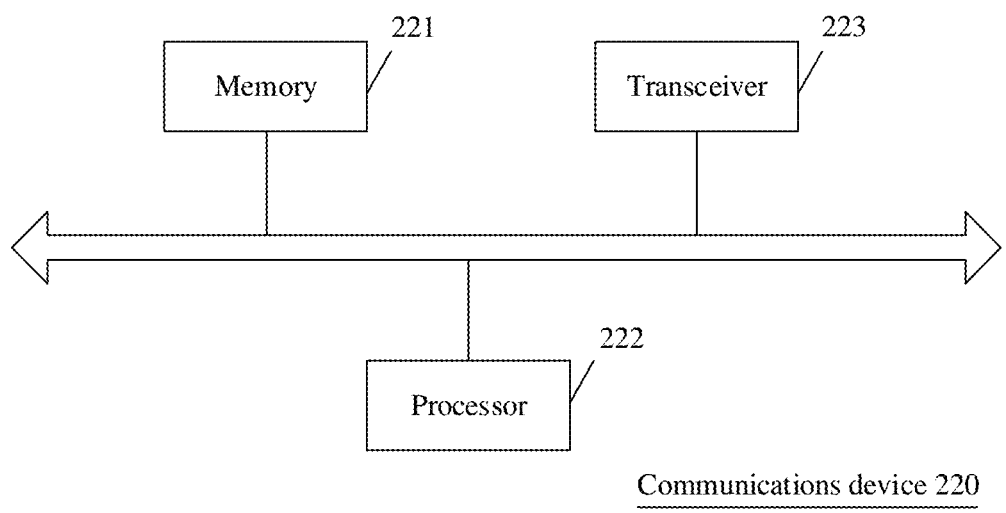
FIG. 22 is a schematic structural diagram of a communications device 220 according to an embodiment of this application.

FIG. 22 is a schematic structural diagram of a communications device 220 according to an embodiment of this application. As shown in FIG. 22, the device 220 includes: a memory 221, a processor 222, and a transceiver 223. The memory 221 is configured to store an instruction, the processor 222 is configured to execute the instruction, to implement the following corresponding functions, and the processor 222 is configured to control the transceiver 223 to implement the following corresponding functions.

The device 220 further includes a plurality of first antennas, configured to send, on a first carrier, synchronization signal blocks SSBs of a first synchronization signal burst set SS Burst Set.

The processor 222, configured to: determine a first time offset when at least one first antenna completes LBT, where the first time offset is a time offset of an actual transmission time of the first SS Burst Set on the first carrier relative to a configured transmission time of the first SS Burst Set.

The transceiver 223 is configured to send the first time offset to a terminal.

Optionally, the transceiver 223 is further configured to send first indication information to the terminal, where the first indication information is used to indicate whether the plurality of first antennas separately complete the LBT when sending the SSBs of the first SS Burst Set, or the first indication information is used to indicate whether the SSBs of the first SS Burst Set are successfully sent.

Optionally, the transceiver 223 is further configured to: if an SSB corresponding to a second antenna is not successfully sent, send downlink data to the terminal by using a time-frequency resource of the SSB corresponding to the second antenna, where the second antenna is any one of the first antennas.

Optionally, the device 220 further includes: a plurality of third antennas, configured to send SSBs of a second SS Burst Set.

The processor 222 is further configured to determine a second time offset when at least one third antenna completes the LBT, where the second time offset is a time offset of an actual transmission time of the second SS Burst Set on the second carrier relative to a configured transmission time of the second SS Burst Set.

The transceiver 223 is further configured to: if there is a first preset relationship between the second time offset and the first time offset, skip sending the second time offset; or if there is no first preset relationship between the second time offset and the first time offset, send the second time offset.

Optionally, the first preset relationship is that the second time offset is the same as the first time offset, or there is a fixed time interval between the first time offset and the second time offset.

Optionally, if there is a second preset relationship between LBT statuses that the plurality of third antennas have when the plurality of third antennas send the SSBs of the second SS Burst Set and LBT statuses that the plurality of first antennas have when the plurality of first antennas send the SSBs of the first SS Burst Set, and the LBT statuses are that the LBT is completed or the LBT is not completed, the first indication information is further used to indicate whether the plurality of third antennas separately complete the LBT when sending the SSBs of the second SS Burst Set, or the first indication information is further used to indicate whether the SSBs of the second SS Burst Set are successfully sent; or if there is no second preset relationship between the LBT statuses that the plurality of third antennas have when the plurality of third antennas send the SSBs of the first SS Burst Set and the LBT statuses that the plurality of first antennas have when the plurality of first antennas send the SSBs of the first SS Burst Set, the transceiver 223 is further configured to send second indication information to the terminal, where the second indication information is used to indicate whether the plurality of third antennas separately complete the LBT when sending the SSBs of the second SS Burst Set, or the second indication information is used to indicate whether the SSBs of the second SS Burst Set are successfully sent.

Optionally, the second preset relationship is that the LBT statuses that the plurality of third antennas have when the plurality of third antennas send the SSBs of the first SS Burst Set are the same as the LBT statuses that the plurality of first antennas have when the plurality of first antennas send the SSBs of the first SS Burst Set, or there is a fixed correspondence between the LBT statuses that the plurality of third antennas have when the plurality of third antennas send the SSBs of the first SS Burst Set and the LBT statuses that the plurality of first antennas have when the plurality of first antennas send the SSBs of the first SS Burst Set.

Optionally, a length of the first time offset is X bits, and a maximum value of the first time offset is a time length of $$\left\lceil \frac{M}{N} \times 2^{K-X} \right\rceil$$

SSBs, where M represents a maximum time offset of the first SS Burst Set, N represents a time length of the first SS Burst Set, and $2^K$ represents a maximum quantity of SSBs that can be transmitted in one SS Burst Set window by a communications system to which the network device and the terminal belong.

Optionally, the length of the first indication information is Y bits, each of the Y bits is used to represent LBT statuses of $$\left\lceil \frac{Z}{Y} \right\rceil$$

first antennas, where Z represents a quantity of the plurality of first antennas.

The communications device provided in this application may perform the method related to the terminal in Embodiment 3, Embodiment 4, Embodiment 5, or Embodiment 6. A principle and an effect of the communications device are not described herein again in this application.

Embodiment 14

Figure 23:
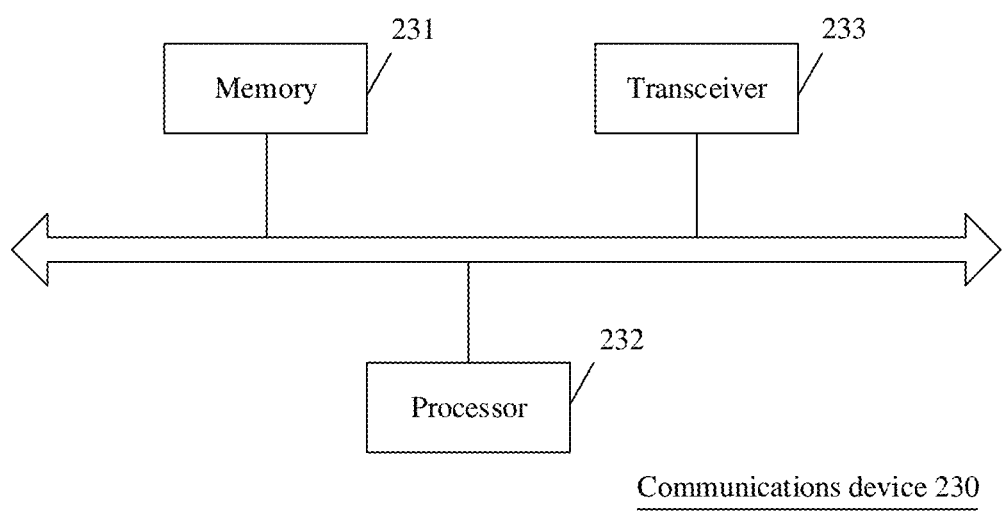
FIG. 23 is a schematic structural diagram of a communications device 230 according to an embodiment of this application.

FIG. 23 is a schematic structural diagram of a communications device 230 according to an embodiment of this application. As shown in FIG. 23, the device 230 includes: a memory 231, a processor 232, and a transceiver 233. The memory 231 is configured to store an instruction, the processor 232 is configured to execute the instruction, to implement the following corresponding functions, and the processor 232 is configured to control the transceiver 233 to implement the following corresponding functions.

The transceiver 233 is configured to receive a first time offset sent by a network device, where the first time offset is a time offset of an actual transmission time of a first synchronization signal burst set SS Burst Set on a first carrier relative to a configured transmission time of the first SS Burst Set.

The processor 232 is configured to perform rate matching on the first carrier based on the first time offset.

Optionally, the transceiver 233 is further configured to receive first indication information sent by the network device, where the first indication information is used to indicate whether a plurality of first antennas separately complete the LBT when sending SSBs of the first SS Burst Set, or the first indication information is used to indicate whether SSBs of the first SS Burst Set are successfully sent.

Optionally, the transceiver 233 is further configured to: if the first indication information indicates that a second antenna does not complete the LBT when sending the SSBs of the first SS Burst Set, or the first indication information indicates that an SSB corresponding to the second antenna is not successfully sent, receive downlink data by using a time-frequency resource of the SSB corresponding to the second antenna, where the second antenna is any one of the first antennas.

Optionally, the processor 232 is further configured to: when the transceiver 233 does not receive a second time offset, perform the rate matching on a second carrier based on the first time offset, where the second time offset is a time offset of an actual transmission time of a second SS Burst Set on the second carrier relative to a configured transmission time of the second SS Burst Set; or when the transceiver 233 receives the second time offset, perform the rate matching on the second carrier based on the second time offset.

Optionally, the first indication information is further used to indicate whether a plurality of third antennas complete the LBT when sending SSBs of the second SS Burst Set, or the first indication information is further used to indicate whether the SSBs of the second SS Burst Set are successfully sent; or the transceiver 233 is further configured to receive second indication information sent by the network device, where the second indication information is used to indicate whether a plurality of third antennas separately complete the LBT when sending the SSBs of the second SS Burst Set, or the second indication information is used to indicate whether the SSBs of the second SS Burst Set are successfully sent.

Optionally, a length of the first time offset is X bits, and a maximum value of the first time offset is a time length of $$\left\lceil \frac{M}{N} \times 2^{K-X} \right\rceil$$

SSBs, where M represents a maximum time offset of the first SS Burst Set, N represents a time length of the first SS Burst Set, and $2^K$ represents a maximum quantity of SSBs that can be transmitted in one SS Burst Set window by a communications system to which the network device and the terminal belong.

Optionally, the length of the first indication information is Y bits, each of the Y bits is used to represent LBT statuses of $$\left\lceil \frac{Z}{Y} \right\rceil$$

first antennas, where Z represents a quantity of the plurality of first antennas.

The communications device provided in this application may perform the method related to the terminal in Embodiment 3, Embodiment 4, Embodiment 5, or Embodiment 6. A principle and an effect of the communications device are not described herein again in this application.

What is claimed is:

1. A communication method, comprising:
   performing, by a network device, listen before talk (LBT) on a first carrier;
   determining, by the network device, a first time offset in response to determining that the LBT is completed;
   sending, by the network device, the first time offset to a terminal; and
   sending, by the network device, first indication information to the terminal;

wherein a first synchronization signal burst set (SS Burst Set) is sent on the first carrier, wherein the first SS Burst Set comprises a set of synchronization signal bursts (SSBs), and wherein the first time offset is a time offset of an actual transmission time of the first SS Burst Set on the first carrier relative to a configured transmission time of the first SS Burst Set; and wherein the first indication information indicates whether a plurality of first antennas separately complete the LBT during the sending of the SSBs of the first SS Burst Set, or wherein the first indication information indicates whether the SSBs of the first SS Burst Set are successfully sent.

2. The method according to claim 1, further comprising:
performing, by the network device, the LBT on a second carrier;
determining, by the network device, a second time offset in response to determining that the LBT is completed;
determining, by the network device, whether there is a first preset relationship between the second time offset and the first time offset;
skipping sending, by the network device, in response to determining that there is a first preset relationship between the second time offset and the first time offset, the second time offset; and
sending, by the network device, in response to determining that there is no first preset relationship between the second time offset and the first time offset, the second time offset;
wherein a second SS Burst Set is sent on the second carrier, wherein the second SS Burst Set comprises a second set of SSBs, and wherein the second time offset is a time offset of an actual transmission time of the second SS Burst Set on the second carrier relative to a configured transmission time of the second SS Burst Set.

3. The method according to claim 2, wherein the first preset relationship is that the second time offset is the same as the first time offset, or there is a fixed time interval between the first time offset and the second time offset.

4. The method according to claim 1, wherein the LBT is performed on the plurality of first antennas of the network device, and wherein determining the first time offset in response to determining that the LBT is completed comprises determining the first time offset based on the time when at least one first antenna has completed the LBT, and wherein the SSBs of the first SS Burst set are sent on the plurality of first antennas.

5. The method according to claim 4, further comprising:
in response to determining that an SSB corresponding to a second antenna is not successfully sent, sending, by the network device, downlink data to the terminal by using a time-frequency resource of the SSB corresponding to the second antenna, wherein the second antenna is any one of the first antennas.

6. The method according to claim 4, further comprising:
performing, by a plurality of third antennas of the network device, the LBT on a second carrier;
determining, by the network device, a second time offset in response to determining that at least one third antenna has completed the LBT;
determining, by the network device, whether there is a first preset relationship between the second time offset and the first time offset;
skipping sending, by the network device, in response to determining that there is a first preset relationship between the second time offset and the first time offset, the second time offset; and sending, by the network device, the second time offset, in response to determining that there is no first preset relationship between the second time offset and the first time offset;
wherein the plurality of third antennas are configured to send SSBs of a second SS Burst Set, and wherein the second time offset is a time offset of an actual transmission time of the second SS Burst Set on the second carrier relative to a configured transmission time of the second SS Burst Set.

7. The method according to claim 6, wherein the first preset relationship is that the second time offset is the same as the first time offset, or there is a fixed time interval between the first time offset and the second time offset.

8. The method according to claim 6, further comprising:
sending, from the plurality of first antennas, the SSBs of the first SS Burst Set, the plurality of first antennas having first LBT statuses during the sending of the SSBs of the first SS Burst Set, the first LBT statuses defining that the LBT is completed or the LBT is not completed;
sending, from the plurality of third antennas, the SSBs of the second SS Burst set, the plurality of third antennas having second LBT statuses during the sending of the SSBs of the second SS Burst set, the second LBT statuses defining that the LBT is completed or the LBT is not completed:
wherein in response to determining that there is a second preset relationship between the second LBT statuses and the first LBT statuses, the first indication information further indicating whether the plurality of third antennas separately complete the LBT during the sending of the SSBs of the second SS Burst Set, or the first indication information further indicating whether the SSBs of the second SS Burst Set are successfully sent; and
wherein in response to determining that there is no second preset relationship between the second LBT statuses and the first LBT statuses, the network device sends second indication information to the terminal, wherein the second indication information indicates whether the plurality of third antennas separately complete the LBT during the sending of the SSBs of the second SS Burst Set, or the second indication information indicates whether the SSBs of the second SS Burst Set are successfully sent.

9. The method according to claim 8, wherein the second preset relationship is that the second LBT statuses are the same as the first LBT statuses, or there is a fixed correspondence between the second LBT statuses and the first LBT statuses.

10. A communication method, comprising:
receiving, by a terminal, a first time offset sent by a network device, wherein the first time offset is a time offset of an actual transmission time of a first synchronization signal burst set (SS Burst Set) on a first carrier relative to a configured transmission time of the first SS Burst Set, and wherein the first SS Burst Set comprises a set of synchronization signal bursts (SSBs);
performing, by the terminal, rate matching on the first carrier based on the first time offset; and
receiving, by the terminal, first indication information sent by the network device, wherein the first indication information indicates whether a plurality of first antennas separately complete LBT during the sending of the SSBs of the first SS Burst Set, or the first indication information indicates whether the SSBs of the first SS Burst Set are successfully sent.

11. The method according to claim 10, further comprising:
in response to determining that the first indication information indicates that a second antenna does not complete the LBT during the sending of the SSBs of the first SS Burst Set, or the first indication information indicates that an SSB corresponding to the second antenna is not successfully sent, receiving, by the terminal, downlink data by using a time-frequency resource of the SSB corresponding to the second antenna, wherein the second antenna is any one of the first antennas.

12. The method according to claim 10, further comprising:
in response to determining that the terminal does not receive a second time offset, performing, by the terminal, the rate matching on a second carrier based on the first time offset, wherein the second time offset is a time offset of an actual transmission time of a second SS Burst Set on the second carrier relative to a configured transmission time of the second SS Burst Set, the second SS Burst Set comprising a set of synchronization signal bursts (SSBs); and
in response to determining that the terminal receives a second time offset, performing, by the terminal, the rate matching on a second carrier based on the second time offset.

13. The method according to claim 12, wherein
the first indication information further indicates whether a plurality of third antennas complete the LBT during the sending of the SSBs of the second SS Burst Set, or the first indication information further indicates whether the SSBs of the second SS Burst Set are successfully sent; or
the terminal receives second indication information sent by the network device, wherein the second indication information indicates whether a plurality of third antennas separately complete the LBT during the sending of the SSBs of the second SS Burst Set, or the second indication information indicates whether the SSBs of the second SS Burst Set are successfully sent.

14. The method according to claim 10, wherein a length of the first indication information is Y bits, each of the Y bits is used to represent LBT statuses of $$\left\lceil \frac{Z}{Y} \right\rceil$$

first antennas, wherein Z represents a quantity of the plurality of first antennas.

15. The method according to claim 10, wherein a length of the first time offset is X bits, and a maximum value of the first time offset is a time length of $$\left\lceil \frac{M}{N} \times 2^{K-X} \right\rceil$$

SSBs, wherein M represents a maximum time offset of the first SS Burst Set, N represents a time length of the first SS Burst Set, and $2^K$ represents a maximum quantity of SSBs that can be transmitted in one SS Burst Set window by a communications system to which the network device and the terminal belong, and X represents a length of the first time offset in bits.

16. A communications device, comprising:
a processor;
a transceiver; and
a computer-readable non-transitory memory storing a program comprising instructions that; when executed on the processor; cause the processor to:
perform listen before talk LBT on a first carrier;
determine a first time offset in response to determining that the LBT is completed;
send, using the transceiver, the first time offset to a terminal; and
send, using the transceiver, first indication information to the terminal;
wherein a first synchronization signal burst set (SS Burst Set) is sent on the first carrier, wherein the first SS Burst Set comprises a set of synchronization signal bursts (SSBs), and wherein the first time offset is a time offset of an actual transmission time of the first SS Burst Set on the first carrier relative to a configured transmission time of the first SS Burst Set; and
wherein the first indication information indicates whether a plurality of first antennas separately complete the LBT during the sending of the SSBs of the first SS Burst Set, or wherein the first indication information indicates whether the SSBs of the first SS Burst Set are successfully sent.

17. The device according to claim 16, wherein the program comprises further instructions that, when executed on the processor, cause the processor to:
perform the LBT on a second carrier;
determine a second time offset in response to determining that the LBT is completed;
determine whether there is a first preset relationship between the second time offset and the first time offset;
skip sending, in response to determining that there is a first preset relationship between the second time offset and the first time offset, the second time offset; and
send, in response to determining that there is no first preset relationship between the second time offset and the first time offset, the second time offset;
wherein a second SS Burst Set is sent on the second carrier, and the second time offset is a time offset of an actual transmission time of the second SS Burst Set on the second carrier relative to a configured transmission time of the second SS Burst Set.

18. The device according to claim 17, wherein the first preset relationship is that the second time offset is the same as the first time offset, or there is a fixed time interval between the first time offset and the second time offset.

19. The device according to claim 16, wherein the LBT is performed on the plurality of first antennas of the device, and wherein determining the first time offset in response to determining that the LBT is completed comprises determining the first time offset based on the time when at least one first antenna has completed the LBT, and wherein the SSBs of the first SS Burst set are sent on the plurality of first antennas.

* * * * *